(12) United States Patent
Kobayashi et al.

(10) Patent No.: US 12,177,568 B2
(45) Date of Patent: Dec. 24, 2024

(54) SIGNAL PROCESSING DEVICE, SIGNAL PROCESSING METHOD, SIGNAL PROCESSING PROGRAM, IMAGING APPARATUS AND LENS APPARATUS

(71) Applicant: FUJIFILM Corporation, Tokyo (JP)

(72) Inventors: Toshiki Kobayashi, Saitama (JP); Yota Akashi, Saitama (JP); Yuya Hirakawa, Saitama (JP); Yuta Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/526,482

(22) Filed: Dec. 1, 2023

(65) Prior Publication Data

US 2024/0107164 A1    Mar. 28, 2024

Related U.S. Application Data

(63) Continuation of application No. 18/049,590, filed on Oct. 25, 2022, now Pat. No. 11,877,061, which is a
(Continued)

(30) Foreign Application Priority Data

Apr. 28, 2020  (JP) ................................ 2020-079187

(51) Int. Cl.
*H04N 23/68* (2023.01)
(52) U.S. Cl.
CPC ....... *H04N 23/683* (2023.01); *H04N 23/6812* (2023.01)
(58) Field of Classification Search
None
See application file for complete search history.

(56) References Cited

U.S. PATENT DOCUMENTS 11,877,061 B2 * 1/2024 Kobayashi ........... H04N 23/687
2005/0018051 A1   1/2005 Tomita et al.
(Continued)

FOREIGN PATENT DOCUMENTS

JP   2005-043780 A   2/2005
JP   2008-145523 A   6/2008
(Continued)

OTHER PUBLICATIONS

An Office Action; "Notice of Reasons for Refusal," mailed by the Japanese Patent Office on Dec. 28, 2023, which corresponds to Japanese Patent Application No. 2022-518020 and is related to U.S. Appl. No. 18/526,482; with English language translation.
(Continued)

*Primary Examiner* — Cynthia Segura
(74) *Attorney, Agent, or Firm* — Studebaker & Brackett PC

(57) ABSTRACT

Provided are a signal processing device, a signal processing method, a signal processing program, an imaging apparatus, and a lens apparatus capable of accurately removing an offset from an output signal of a blurring detection sensor. The signal processing device comprises the blurring detection sensor and a processor. The processor is configured to execute processing of extracting a first feature amount relating to the offset from the output signal of the blurring detection sensor, processing of integrating the output signal, processing of extracting a second feature amount relating to the offset from a value obtained by integrating the output signal, processing of calculating the offset on the basis of the first feature amount and the second feature amount, and processing of subtracting the calculated offset from the output signal.

8 Claims, 29 Drawing Sheets

Related U.S. Application Data continuation of application No. PCT/JP2021/016459, filed on Apr. 23, 2021.

(56) References Cited

U.S. PATENT DOCUMENTS

| | | | |
|---|---|---|---|
| 2005/0128309 A1 | 6/2005 | Tomita et al. | |
| 2008/0136926 A1 | 6/2008 | Hatanaka et al. | |
| 2015/0036011 A1 | 2/2015 | Wakamatsu | |
| 2018/0278850 A1* | 9/2018 | Kim | G03B 5/00 |
| 2018/0302539 A1* | 10/2018 | Hirai | H04N 23/66 |
| 2019/0098215 A1* | 3/2019 | Narita | G06T 7/50 |
| 2019/0222760 A1 | 7/2019 | Takeuchi | |
| 2022/0150408 A1* | 5/2022 | Jang | H04N 23/687 |
| 2023/0232104 A1* | 7/2023 | Kobayashi | H04N 23/683 |
| | | | 348/208.1 |

FOREIGN PATENT DOCUMENTS

| | | |
|---|---|---|
| JP | 2008-283443 A | 11/2008 |
| JP | 2015-031779 A | 2/2015 |
| JP | 2017-138493 A | 8/2017 |
| JP | 2018-180288 A | 11/2018 |
| JP | 2018-180302 A | 11/2018 |
| JP | 2018-197772 A | 12/2018 |
| JP | 2019-124871 A | 7/2019 |

OTHER PUBLICATIONS

International Search Report issued in PCT/JP2021/016459; mailed Jun. 22, 2021.

International Preliminary Report on Patentability (Chapter I) and Written Opinion of the International Searching Authority issued in PCT/JP2021/016459; issued Oct. 27, 2022.

An Office Action mailed by the Japanese Patent Office on Apr. 22, 2024, which corresponds to Japanese Patent Application No. 2022-518020 and is related to U.S. Appl. No. 18/526,482.

* cited by examiner

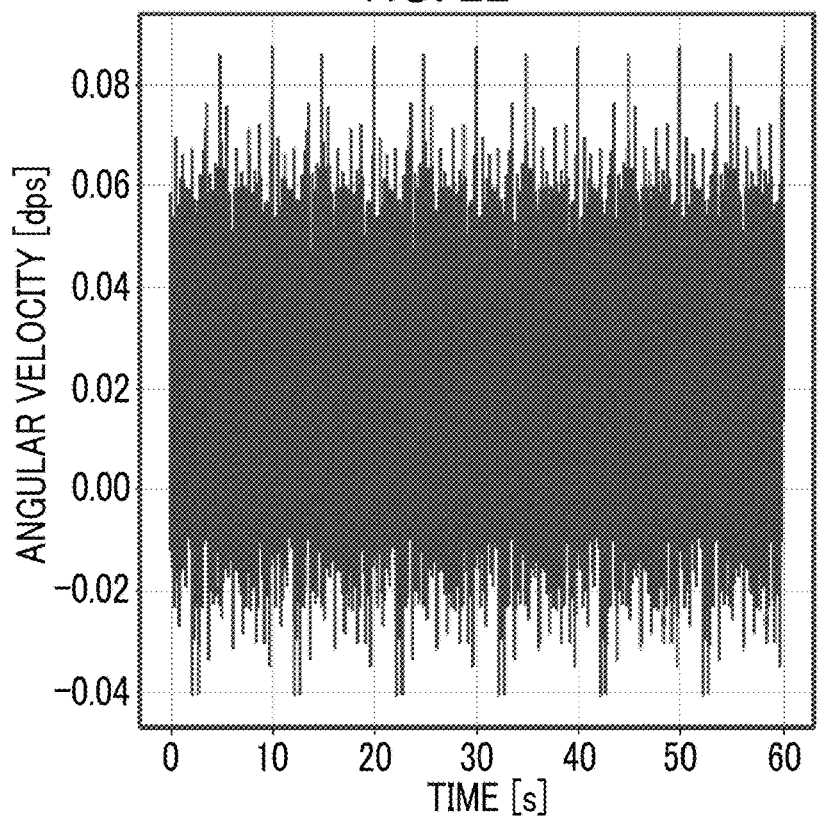
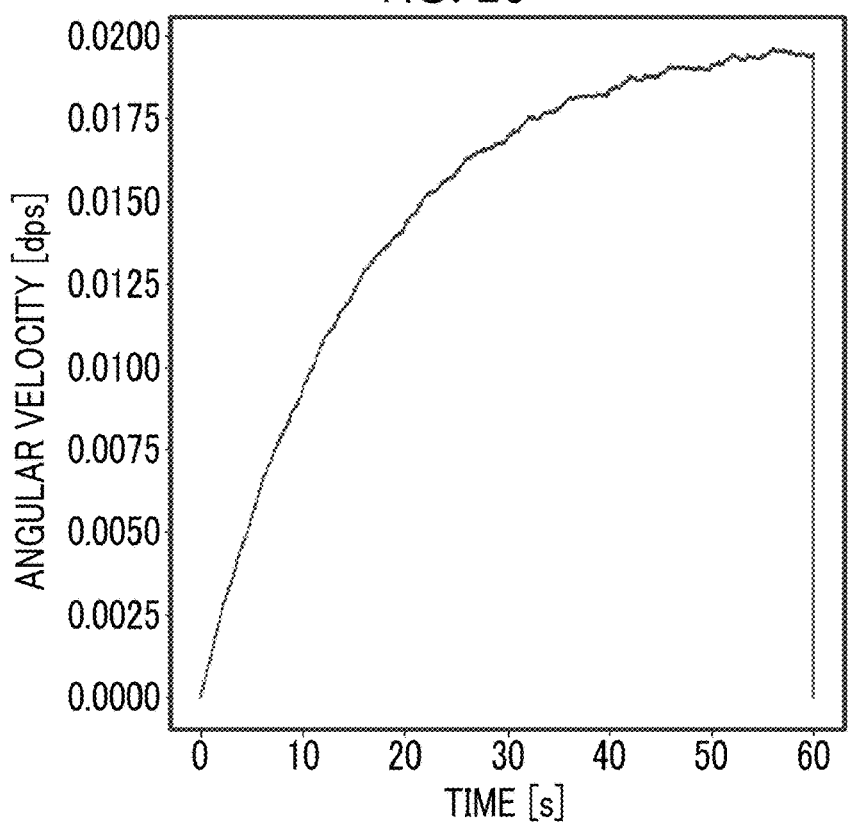

SIGNAL PROCESSING DEVICE, SIGNAL PROCESSING METHOD, SIGNAL PROCESSING PROGRAM, IMAGING APPARATUS AND LENS APPARATUS

CROSS-REFERENCE TO RELATED APPLICATIONS

The present application is a Continuation of U.S. patent application Ser. No. 18/049,590 filed on Oct. 25, 2022, which is a Continuation of PCT International Application No. PCT/JP2021/016459 filed on Apr. 23, 2021, claiming priority under 35 U.S.C § 119(a) to Japanese Patent Application No. 2020-079187 filed on Apr. 28, 2020. Each of the above applications is hereby expressly incorporated by reference, in its entirety, into the present application.

BACKGROUND OF THE INVENTION

1. Field of the Invention

The present invention relates to a signal processing device, a signal processing method, a signal processing program, an imaging apparatus, and a lens apparatus, and in particular, a signal processing device that processes an output signal of a blurring detection sensor, a signal processing method, a signal processing program, an imaging apparatus, and a lens apparatus.

2. Description of the Related Art

In a case where an offset is present in the output signal of the blurring detection sensor, processing of removing the offset from the output signal is performed (for example, JP2008-283443A, JP2018-197772A, and the like).

SUMMARY OF THE INVENTION

An embodiment according to the technique of the present disclosure provides a signal processing device, a signal processing method, a signal processing program, an imaging apparatus, and a lens apparatus capable of accurately removing an offset from an output signal of a blurring detection sensor.

(1) A signal processing device comprises: a blurring detection sensor; and a processor, in which the processor is configured to execute processing of extracting a first feature amount relating to an offset from an output signal of the blurring detection sensor, processing of integrating the output signal, processing of extracting a second feature amount relating to the offset from a value obtained by integrating the output signal, processing of calculating the offset on the basis of the first feature amount and the second feature amount, and processing of subtracting the calculated offset from the output signal.

(2) The signal processing device according to (1), in which the processor sets an amount, which is calculated from a gradient of an accumulated integral value of the output signal, as the second feature amount.

(3) The signal processing device according to (1) or (2), in which the processor sets an amount of direct current component, which is calculated from the output signal, as the first feature amount.

(4) The signal processing device according to any one of (1) to (3), further comprising a storage unit that stores the calculated offset, in which the processor is configured to store the calculated offset in the storage unit on the basis of the first feature amount and the second feature amount, and execute processing of subtracting the stored offset from the output signal.

(5) The signal processing device according to any one of (1) to (4), in which the processor is configured to further execute processing of calculating an absolute value of a difference between the first feature amount and the second feature amount, processing of measuring a time, during which the absolute value of the difference between the first feature amount and the second feature amount is kept equal to or less than a first threshold value, in a case where the absolute value is equal to or less than the first threshold value, and processing of storing the offset in a case where the time during which the absolute value is kept equal to or less than the first threshold value is equal to or greater than a second threshold value.

(6) The signal processing device according to any one of (1) to (5), in which the processor is configured to calculate ½ of a sum of the first feature amount and the second feature amount as the offset.

(7) The signal processing device according to any one of (1) to (6), in which the processor is configured to further execute processing of calculating an amount of change of the second feature amount, and initialize processing relating to calculation of the offset in a case where the calculated amount of change of the second feature amount is greater than a third threshold value.

(8) The signal processing device according to any one of (1) to (7), in which the processor is configured to further execute processing of determining a stationary state on the basis of the output signal, and processing relating to calculation of the offset in a case where the stationary state is determined.

(9) The signal processing device according to any one of (4) to (8), in which the processor is configured to further execute processing of acquiring temperature information in a case where the offset is calculated, and store the calculated offset for each temperature.

(10) An imaging apparatus comprising: a blurring detection sensor that is provided in an apparatus body; and the signal processing device according to any one of (1) to (9) that processes an output signal of the blurring detection sensor.

(11) A lens apparatus comprising: a blurring detection sensor that is provided in an apparatus body; and the signal processing device according to any one of claims (1) to (9) that processes an output signal of the blurring detection sensor.

(12) A signal processing method of processing an output signal of a blurring detection sensor, the signal processing method comprising: a step of extracting a first feature amount relating to an offset from the output signal; a step of integrating the output signal; a step of extracting a second feature amount relating to the offset from a value obtained by integrating the output signal; a step of calculating the offset on the basis of the first feature amount and the second feature amount, and a step of subtracting the calculated offset from the output signal.

(13) A signal processing program of processing an output signal of a blurring detection sensor, the signal processing program causing a computer to execute: processing of extracting a first feature amount relating to an offset from the output signal; processing of integrating the output signal; processing of extracting a second feature amount relating to the offset from a value obtained by integrating the output signal; processing of calculating the offset on the basis of the first feature amount and the second feature amount; and processing of subtracting the calculated offset from the output signal.

BRIEF DESCRIPTION OF THE DRAWINGS

FIG. 22 is a diagram showing an example of an output signal of the gyro sensor in the stationary state.

FIG. 23 is a diagram showing an extraction result of the first feature amount.

DESCRIPTION OF THE PREFERRED EMBODIMENTS

Hereinafter, preferred embodiments of the present invention will be described in detail with reference to the accompanying drawings.

First Embodiment

Here, a case where blurring (vibration) of an apparatus body is detected by a gyro sensor in a digital camera provided with a camera shake correction function (also referred to as an image shake correction function) will be described as an example. The digital camera is an example of an imaging apparatus. The gyro sensor is an example of a blurring detection sensor.

In a case where blurring is detected by the gyro sensor, an amount of blurring (amount of blurring in angle) is obtained by integrating an output signal (angular velocity signal) of the gyro sensor. However, an output signal of the gyro sensor has an error called an offset. The offset is a reference value shift (zero point shift) in which the output signal is not 0 even in a state where an angular velocity is 0 [deg/s]. In a case where the amount of blurring is obtained in a state where the output signal includes an offset, an error occurs in the amount of blurring, and it is difficult to perform appropriate correction. Consequently, it is necessary to remove the offset from the output signal of the gyro sensor. However, it is difficult to remove the offset with a fixed value since there are individual differences for each gyro sensor and the offset fluctuates depending on the ambient temperature, chronological change, and the like. Consequently, in a case of detecting blurring with the gyro sensor, it is important how accurately the offset can be obtained and removed.

[Configuration of Digital Camera]

Figure 1:
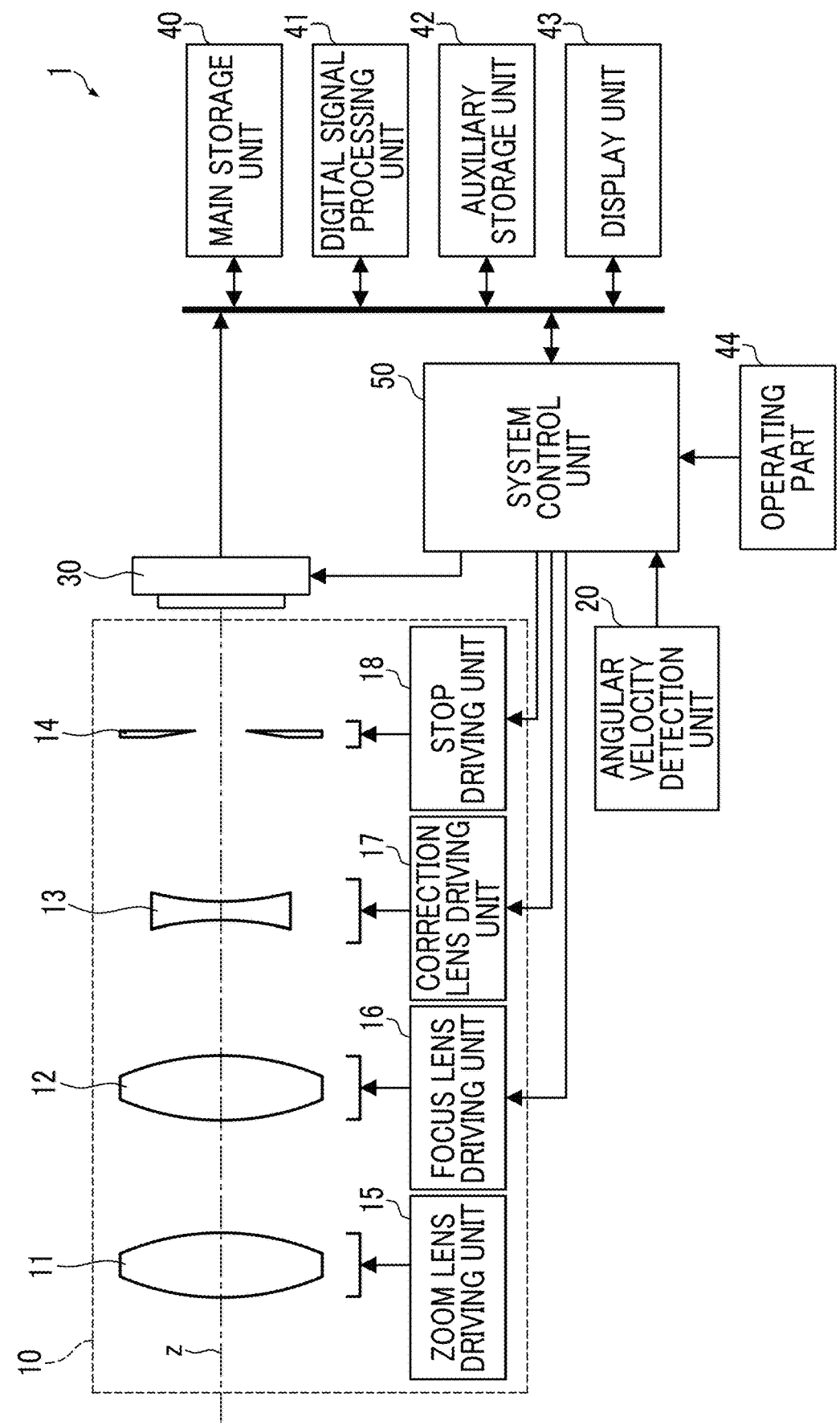
FIG. 1 is a block diagram showing a schematic configuration of a digital camera.

FIG. 1 is a block diagram showing a schematic configuration of the digital camera.

The digital camera 1 according to the present embodiment is a digital camera which is provided with a so-called lens shift type camera shake correction function. The camera shake correction mechanism of the lens shift type moves a correction lens provided in an imaging optical system to correct camera shake.

As shown in FIG. 1, the digital camera 1 comprises an imaging optical system 10, an angular velocity detection unit 20, an imaging element 30, a main storage unit 40, a digital signal processing unit 41, an auxiliary storage unit 42, a display unit 43, an operating part 44, a system control unit 50, and the like.

The imaging optical system 10 is configured to include a zoom lens 11, a focus lens 12, a correction lens 13, and a stop 14.

The zoom lens 11 is a lens for adjusting a focal length. The imaging optical system 10 adjusts the focal length by moving the zoom lens 11 back and forth along an optical axis. The zoom lens 11 is operated by being driven by the zoom lens driving unit 15.

The focus lens 12 is a lens for adjusting the focal length. The imaging optical system 10 adjusts the focal length by moving the focus lens 12 back and forth along the optical axis. The focus lens 12 is operated by being driven by the focus lens driving unit 16.

The correction lens 13 is a lens for camera shake correction. The correction lens 13 moves in a plane orthogonal to the optical axis to correct camera shake.

Figure 2:
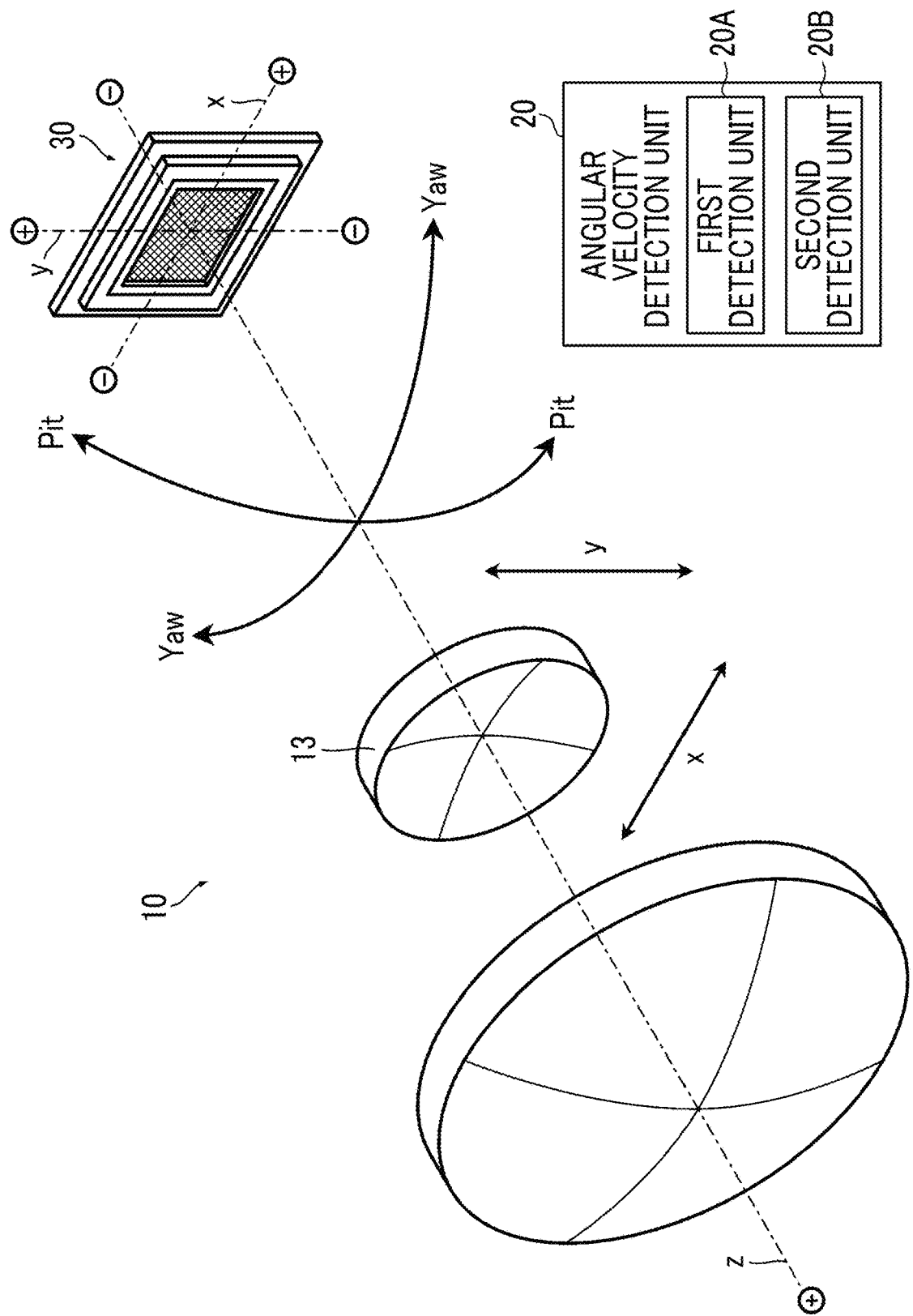
FIG. 2 is a conceptual diagram of movement of a correction lens.

FIG. 2 is a conceptual diagram of movement of the correction lens.

The optical axis is the z axis, the axis orthogonal to the z axis is the x axis, and the axes orthogonal to the z axis and the x axis are the y axis. The x axis is an axis in the horizontal direction (lateral direction). The y axis is an axis in the vertical direction (longitudinal direction). The correction lens 13 moves along a plane (xy plane) defined by the x axis and the y axis. This plane (xy plane) is a plane parallel to the light receiving surface of the imaging element 30.

In a case of correcting camera shake, the correction lens 13 is moved in a direction of offsetting blurring. The correction lens 13 is operated by being driven by a correction lens driving unit 17.

Figure 3:
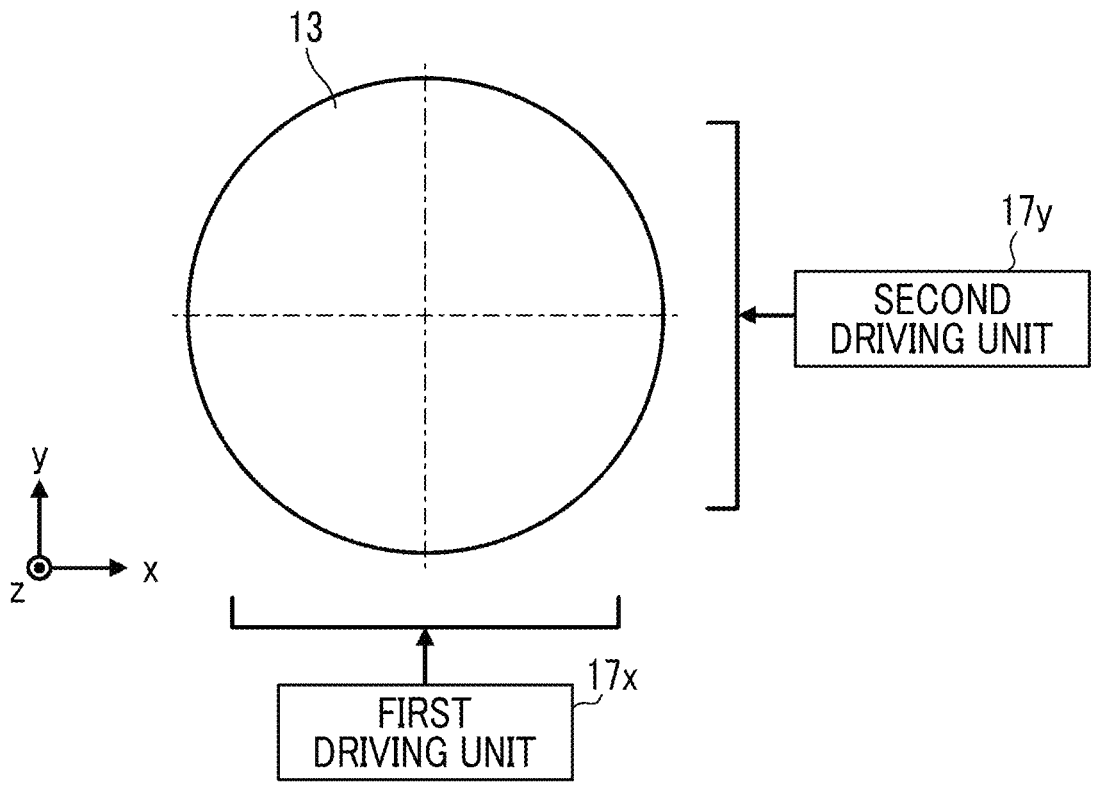
FIG. 3 is a diagram showing a schematic configuration of a correction lens driving unit.

FIG. 3 is a diagram showing a schematic configuration of the correction lens driving unit.

The correction lens driving unit 17 includes a first driving unit 17x and a second driving unit 17y. The first driving unit 17x moves the correction lens 13 along the x axis. The second driving unit 17y moves the correction lens 13 along the y axis.

The stop 14 is composed of, for example, an iris stop. An amount of light passing through the imaging optical system 10 is adjusted by the stop 14. The stop 14 is operated by being driven by the stop driving unit 18.

As shown in FIG. 2, the angular velocity detection unit 20 includes a first detection unit 20A and a second detection unit 20B. The first detection unit 20A detects an angular velocity of a digital camera body (apparatus body) in a yaw direction Yaw. The second detection unit 20B detects the angular velocity of the digital camera body in a pitch direction Pit.

Here, the yaw direction Yaw is a rotation direction about the y axis, as shown in FIG. 2. The yaw direction Yaw is a rotation direction in the horizontal direction (lateral direction) of the digital camera body.

Further, as shown in FIG. 2, the pitch direction Pit is a rotation direction about the x axis. The pitch direction Pit is a rotation direction in the vertical direction (longitudinal direction) of the digital camera body.

Figure 4:
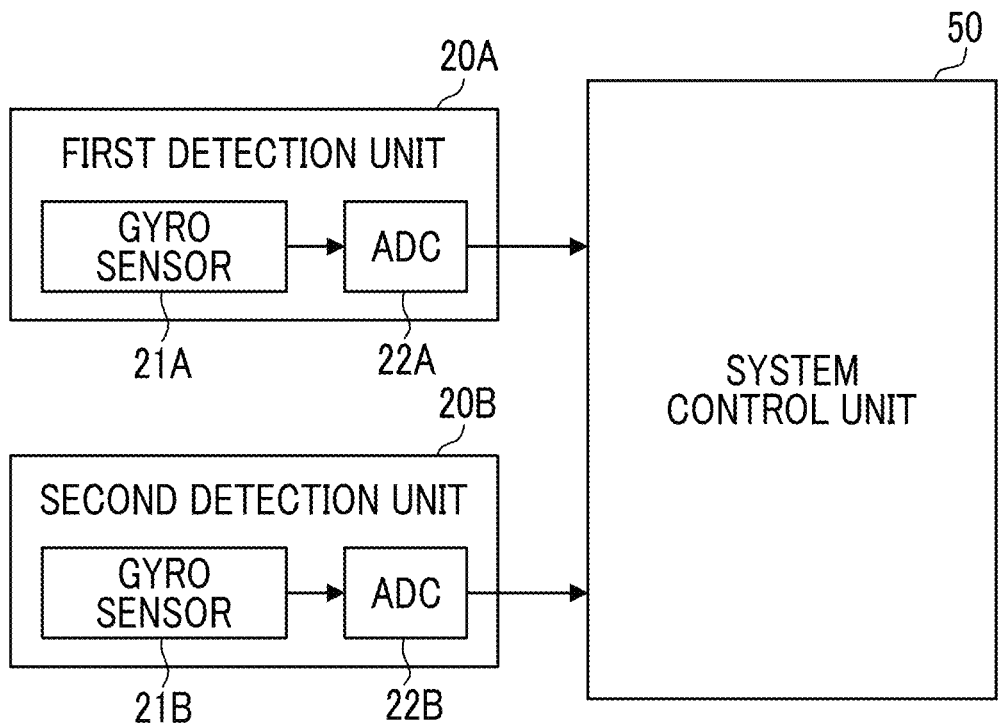
FIG. 4 is a diagram showing a schematic configuration of a first detection unit and a second detection unit.

FIG. 4 is a diagram showing a schematic configuration of the first detection unit and the second detection unit.

The first detection unit 20A and the second detection unit 20B are configured to include both gyro sensors 21A and 21B and an analog to digital converters (ADC) 22A and 22B. The signals (angular velocity signals) which are output from the gyro sensors 21A and 21B are converted into digital signals by the ADCs 22A and 22B and incorporated into the system control unit 50.

The imaging element 30 is composed of, for example, a complementary metal-oxide semiconductor (CMOS) type color image sensor. In the digital camera 1 of the present embodiment, the imaging element 30 is configured to include a driving unit, an analog to digital converter (ADC), a signal processing unit, and the like. In such a case, the imaging element 30 is operated by being driven by a built-in driving unit. Further, the signal of each pixel is converted into a digital signal by the built-in ADC. Furthermore, the signal of each pixel is subjected to processing such as correlation double sampling processing, gain processing, and correction processing by a built-in signal processing unit. The signal processing may be performed on an analog signal of each pixel or may be performed on a digital signal of each pixel.

In addition to the CMOS type image sensor, the imaging element 30 may also be configured with an XY address type image sensor, a Charged Coupled Device (CCD) type image sensor, or the like.

The main storage unit 40 is used as a temporary storage region for data. A signal (image signal) which is output from the imaging element 30 is stored in the main storage unit 40 for each frame. The main storage unit 40 is composed of, for example, a semiconductor memory.

The digital signal processing unit 41 generates image data by performing signal processing such as offset processing, gamma correction processing, demosaic processing, and RGB/YCrCb conversion processing on the image signal obtained by imaging. The digital signal processing unit 41 is composed of, for example, a microprocessor.

The auxiliary storage unit 42 functions as a storage unit for various types of data. The auxiliary storage unit 42 is composed of, for example, a non-volatile semiconductor memory such as an electrically erasable programmable read-only memory (EEPROM). The data stored in the auxiliary storage unit 42 includes, in addition to the image data obtained by imaging, data necessary for control (for example, offset information to be described later). The display unit 43 is used as a monitor for reproducing a captured image, and is used as a monitor for live view by displaying a live view image at the time of imaging. Further, the display unit 43 is used as a monitor for setting in a case where various settings are made. The display unit 43 is composed of, for example, a display such as a liquid crystal display (LCD) or an organic light emitting diode (OLED).

The operating part 44 is configured to include various operating members for operating the digital camera 1. The operating member includes various operation buttons in addition to a power button and a shutter button. Further, in a case where the display unit 43 is composed of a touch panel, the operating member constituting the operating part 44 includes the touch panel. The operating part 44 outputs a signal corresponding to the operation of each operating member to the system control unit 50.

The system control unit 50 controls the entire digital camera 1 in an integrated manner. Further, the system control unit 50 calculates various physical quantities required for control. The system control unit 50 is composed of, for example, a microcomputer which includes a processor and a memory. The processor is composed of, for example, a central processing unit (CPU) or the like. The memory is composed of, for example, a random access memory (RAM), a read only memory (ROM), or the like. The memory stores a program executed by the processor (for example, a signal processing program or the like) and various types of data. The control which is performed by the system control unit 50 includes control of camera shake correction.

[System Configuration for Camera Shake Correction Control]

Figure 5:
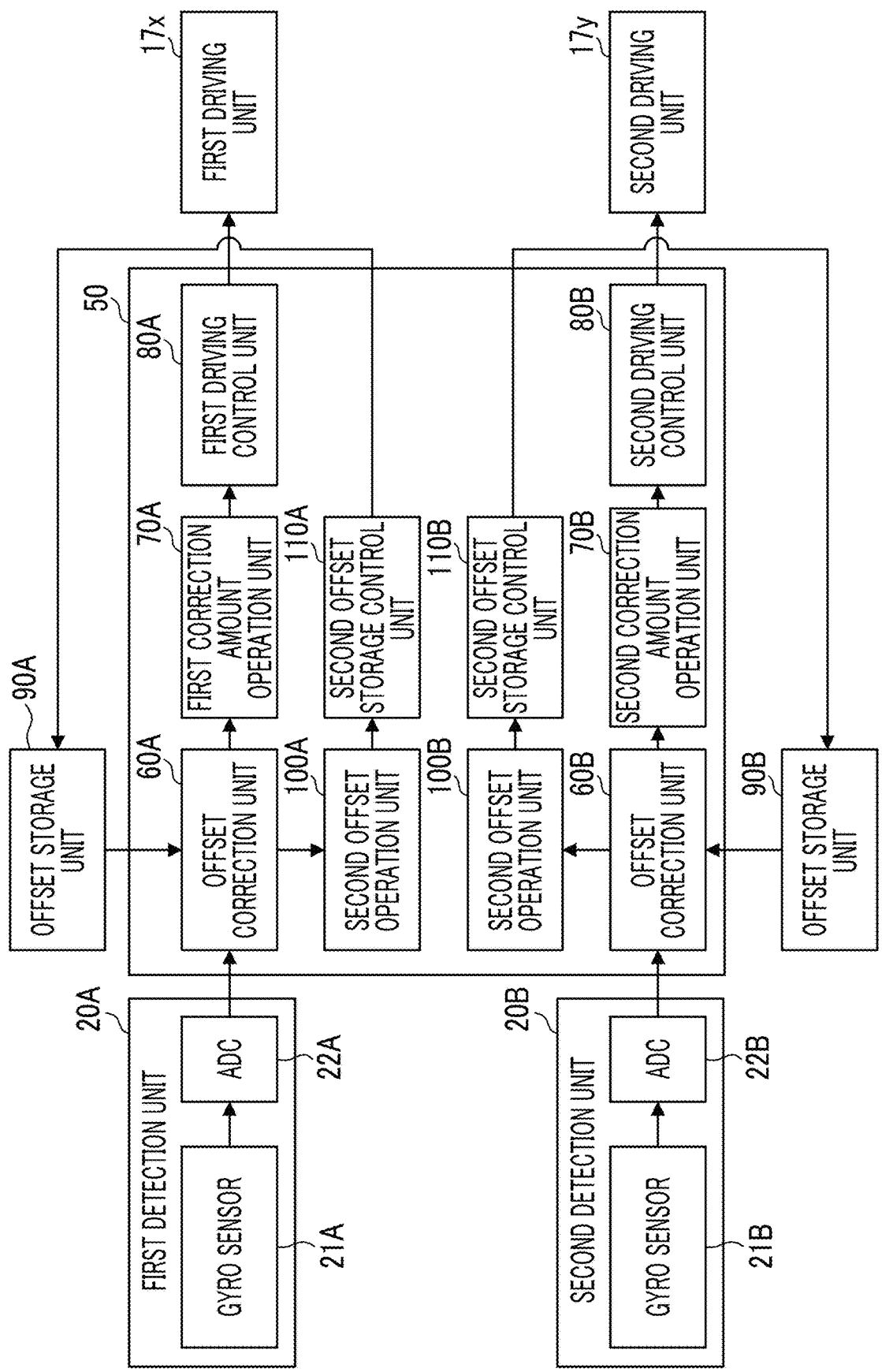
FIG. 5 is a block diagram of functions implemented by a system control unit with respect to control of camera shake correction.

FIG. 5 is a block diagram of functions implemented by the system control unit with respect to the control of camera shake correction.

As shown in the drawing, regarding control of camera shake correction, the system control unit 50 function as offset correction units 60A and 60B, a first correction amount operation unit 70A, a second correction amount operation unit 70B, a first driving control unit 80A, a second driving control units 80B, second offset operation units 100A and 100B, and the second offset storage control units 110A and 110B. The functions are implemented by the processor constituting the system control unit 50 executing a predetermined control program.

The offset correction unit 60A performs processing (offset correction processing) of removing an offset from a signal (an angular velocity signal in the yaw direction) output from the first detection unit 20A on the basis of the information stored in the offset storage unit 90A.

Figure 6:
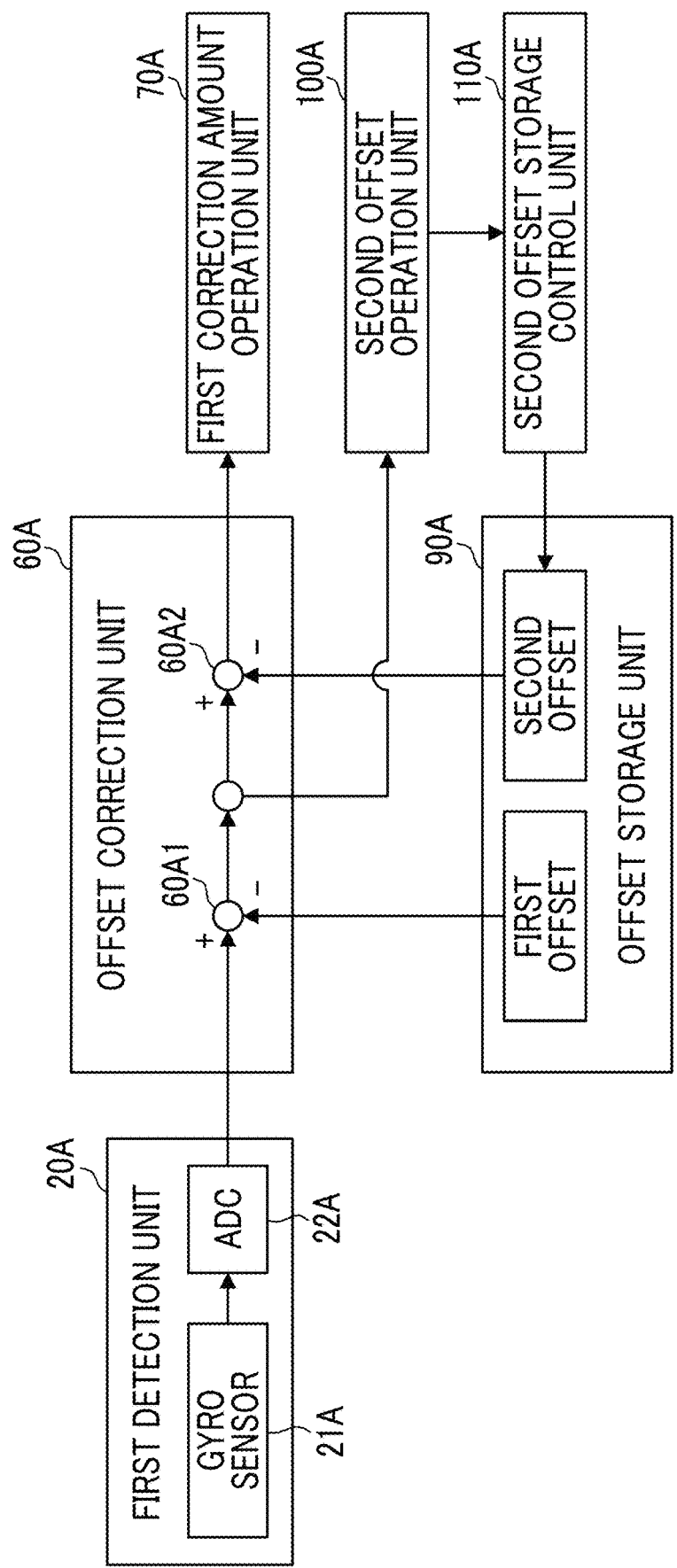
FIG. 6 is a block diagram of functions of an offset correction unit.

FIG. 6 is a block diagram of functions of the offset correction unit.

As shown in the drawing, the offset correction unit 60A has functions of a first subtraction unit 60A1 and a second subtraction unit 60A2.

The first subtraction unit 60A1 subtracts a first offset from an output signal of the first detection unit 20A. The first offset is a standard offset and is a fixed value. The first offset is set, for example, at the time of shipment from a factory. In such a case, for example, the offset is detected at the time of shipment from the factory, and the detected offset is set as the first offset.

The second subtraction unit 60A2 subtracts a second offset from the signal after the first offset is subtracted. The second offset is a latest offset. The second offset is an example of the offset of the present invention. The second offset operation unit 100A calculates the second offset. The second offset operation unit 100A calculates the second offset on the basis of the signal after the first offset is subtracted. The second offset operation unit 100A will be described later in detail.

The offset storage unit 90A is composed of the auxiliary storage unit 42. The offset storage unit 90A stores information about the first offset and the second offset which are used by the offset correction unit 60A. The second offset storage control unit 110A causes the offset storage unit 90A to store the second offset information calculated by the second offset operation unit 100A. The offset storage unit 90A is an example of the storage unit.

The offset correction unit 60B performs processing of removing an offset on a signal (an angular velocity signal in the pitch direction) output from the second detection unit 20B on the basis of the information stored in the offset storage unit 90B. A configuration of the offset correction unit 60B is the same as a configuration of the offset correction unit 60A. Consequently, details of the description thereof will be omitted.

The offset storage unit 90B is composed of the auxiliary storage unit 42. The offset storage unit 90B stores information about the first offset and the second offset used by the offset correction unit 60B. The second offset operation unit 100B calculates the second offset. The second offset operation unit 100B calculates the second offset on the basis of the signal after the first offset is subtracted. The second offset storage control unit 110B causes the offset storage unit 90B to store the calculated second offset information. The offset storage unit 90B is an example of the storage unit.

In the present embodiment, as an example of the signal processing device, there is a configuration including the offset correction units 60A and 60B, the second offset operation units 100A and 100B, the second offset storage control units 110A and 110B, and the offset storage units 90A and 90B.

The first correction amount operation unit 70A calculates a correction amount in the x axis direction of the correction lens 13 on the basis of an angular velocity signal in the yaw direction after the offset correction unit 60A removes the offset. That is, an amount of movement of the correction lens 13 in the x axis direction for correcting blurring in the yaw direction is calculated.

Figure 7:
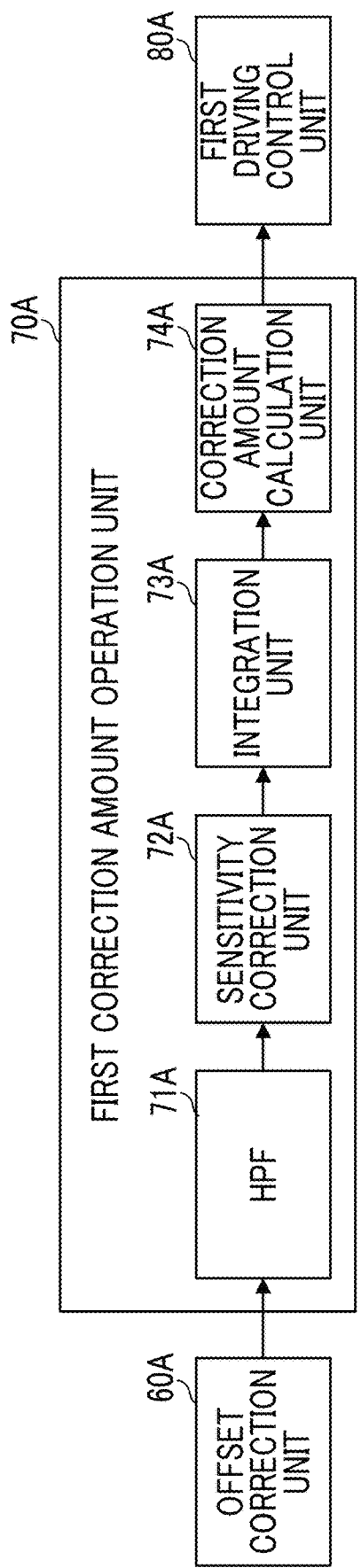
FIG. 7 is a block diagram of functions of a first correction amount operation unit.

FIG. 7 is a block diagram of functions of the first correction amount operation unit.

As shown in the drawing, the first correction amount operation unit 70A has functions of a high-pass filter (HPF) 71A, a sensitivity correction unit 72A, an integration unit 73A, and a correction amount calculation unit 74A.

The high-pass filter 71A performs processing of removing a low-frequency component from the angular velocity signal in the yaw direction after the offset is removed.

The sensitivity correction unit 72A performs processing of multiplying the sensitivity by the angular velocity signal after the high-pass filter processing is performed by the high-pass filter 71A. The sensitivity is a unitless coefficient which is uniquely determined with a position of the focus lens and a focal length (position of the zoom lens) set as variables. Consequently, in a case where the focus lens position and the focal length change from moment to moment, the sensitivity also changes from moment to moment.

The integration unit 73A performs processing of integrating the angular velocity signal after the sensitivity is corrected by the sensitivity correction unit 72A. Thereby, the amount of blurring in the yaw direction is calculated.

The correction amount calculation unit 74A calculates the correction amount in the x axis direction of the correction lens 13 on the basis of the amount of blurring in the yaw direction calculated by the integration unit 73A. That is, the amount of movement of the correction lens 13 in the x axis direction required to offset the blurring in the yaw direction is calculated.

The second correction amount operation unit 70B calculates the correction amount of the correction lens 13 in the y axis direction on the basis of the angular velocity signal in the pitch direction after the offset correction unit 60B removes the offset. That is, the amount of movement of the correction lens 13 in the y axis direction, which is necessary for offsetting the blurring in the pitch direction, is calculated. A configuration of the second correction amount operation unit 70B is the same as a configuration of the first correction amount operation unit 70A. Consequently, details thereof will not be described.

The first driving control unit 80A controls driving of the first driving unit 17x to control the movement of the correction lens 13 in the x axis direction. The first driving control unit 80A controls driving of the first driving unit 17x on the basis of the correction amount in the x axis direction of the correction lens 13 calculated by the first correction amount operation unit 70A.

The second driving control unit 80B controls driving of the second driving unit 17y to control the movement of the correction lens 13 in the y axis direction. The second driving control unit 80B controls driving of the second driving unit 17y on the basis of the correction amount in the y axis direction of the correction lens 13 calculated by the second correction amount operation unit 70B.

The control of camera shake correction is executed in the following procedure. First, the offset correction unit 60A and the offset correction unit 60B perform processing of removing the offset of the signals (angular velocity signals) output from the first detection unit 20A and the second detection unit 20B. Next, on the basis of the signal from which the offset is removed, the first correction amount operation unit 70A and the second correction amount operation unit 70B calculate the correction amount of the correction lens 13 in the x axis direction and the y axis direction. Next, the first driving control unit 80A and the second driving control unit 80B drives the first driving unit 17x and the second driving unit 17y on the basis of the calculated correction amount. Thereby, the correction lens 13 is moved so as to offset the blurring, and the camera shake is corrected.

[Second Offset Operation Unit]

As described above, the second offset operation units 100A and 100B calculate the second offset. Hereinafter, functions of the second offset operation units 100A and 100B will be described. The configurations of the second offset operation unit 100A and the second offset operation unit 100B are the same. Consequently, here, only the second offset operation unit 100A will be described, and the description of the second offset operation unit 100B will be omitted.

Figure 8:
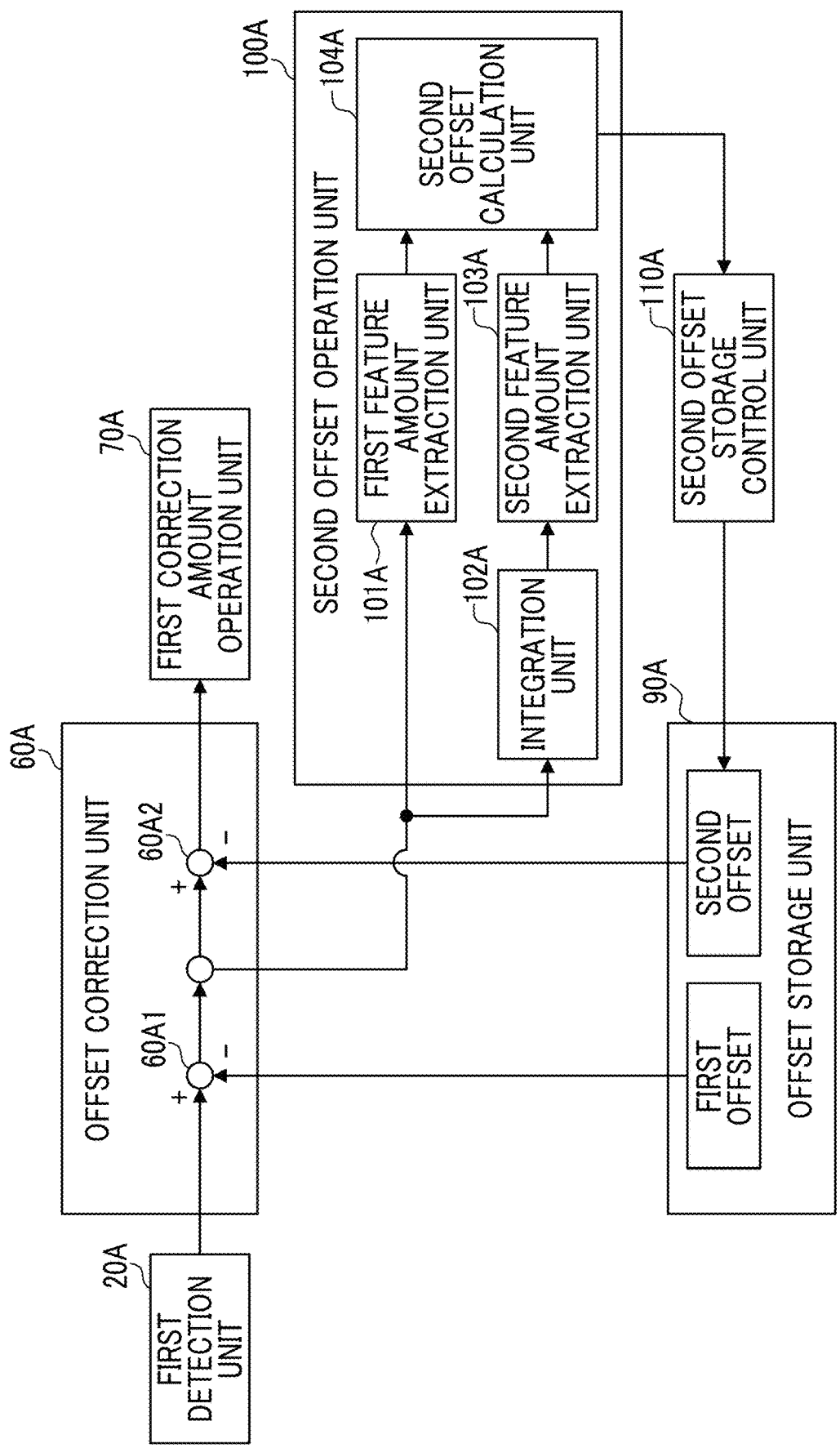
FIG. 8 is a block diagram of functions of a second offset operation unit.

FIG. 8 is a block diagram of functions of the second offset operation unit.

As shown in the drawing, the second offset operation unit 100A has functions of a first feature amount extraction unit 101A, an integration unit 102A, a second feature amount extraction unit 103A, and a second offset calculation unit 104A.

The first feature amount extraction unit 101A performs processing of extracting the first feature amount relating to the second offset from the output signal of the first detection unit 20A after the first offset is removed. Specifically, processing of calculating an amount of direct current (DC) component from the output signal of the first detection unit 20A after removing the first offset is performed, and the calculated amount of direct current component is output as the first feature amount. The first feature amount extraction unit 101A calculates the amount of direct current component, which is the first feature amount, by performing low-pass filter (LPF) processing or band-pass filter (BPF) processing on the output signal of the first detection unit 20A after the first offset is removed. Hereinafter, this point will be described.

It is assumed that a random noise generated from the gyro sensor is f(t), an angular velocity signal generated from the gyro sensor is g(t), and an offset (constant) generated from the gyro sensor is O. The output ω_OUT from the gyro sensor is expressed by Expression (1).

$$\omega\_OUT = f(t) + O + g(t) \quad (1)$$

The offset O which is generated from the gyro sensor is the first feature amount to be obtained. Since the offset O is a direct current component, the components of f(t) and g(t) can be removed by applying a low-pass filter or a band-pass filter to Expression (1). Therefore, it is possible to extract the first feature amount by subjecting the output signal of the first detection unit 20A after the first offset removal to the low-pass filter processing or the band-pass filter processing.

The integration unit 102A performs processing of integrating the output signal of the first detection unit 20A after removing the first offset. The angular signal is obtained by the current processing.

The angular signal deg_out is calculated by Expression (2) by integrating Expression (1).

$$\text{deg\_out} = \int (\omega\_OUT) dt = \int (g(t)) dt + \int (f(t)) dt + Ot + C \quad (2)$$

C: integral constant

The second feature amount extraction unit 103A performs processing of extracting a second feature amount relating to the offset from an output of the integration unit 102A. That is, the second feature amount is extracted from a value (angular signal) obtained by integrating the output signals of the first detection unit 20A. Specifically, a gradient of the accumulated integral value is calculated from the output of the integration unit 102A and set as the second feature amount. The second feature amount extraction unit 103A obtains, for example, a linear approximation curve of the accumulated integral value, calculates a gradient thereof, and extracts the second feature amount. That is, from Expression (2), after enough time has passed, in a case where Ot>>∫(g(t))dt+∫(f(t))dt, it is possible to estimate the offset O from the gradient of the linear approximation curve of deg_out.

Figure 9:
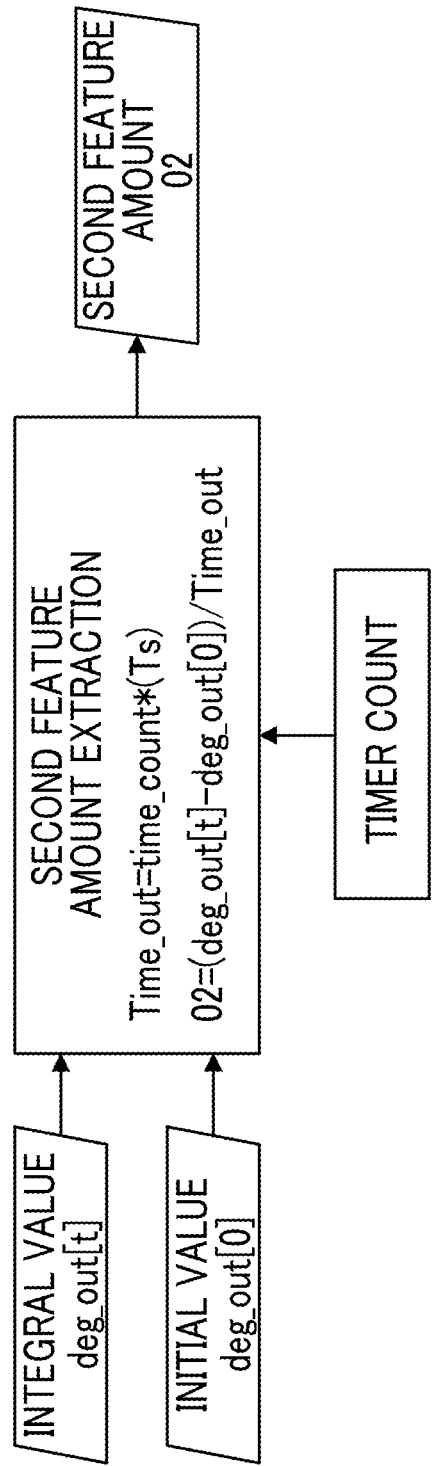
FIG. 9 is a conceptual diagram of a second feature amount extraction processing performed by a second feature amount extraction unit.

FIG. 9 is a conceptual diagram of the extraction processing of the second feature amount performed by the second feature amount extraction unit.

Assuming that ∫(g(t))dt=G[t], ∫(f(t))dt=F[t], and the integral value is deg_out[t], the integral value deg_out[t] is represented by deg_out[t]≈G[t]+F[t]+Ot.

The initial value is an integral value at which calculation of the second feature amount (gradient of the accumulated integral value) is started. The initial value is set to deg_out[0].

In the timer count, the count is incremented by 1 for each control cycle. Then, a value of the control cycle (Ts)[s] is multiplied.

Time_out=time_count*(Ts)

Assuming that the second feature amount (gradient of the accumulated integral value) is O2, O2 is calculated by the following expression.

O2=(deg_out[t]−deg_out[0])/Time_out

The second offset calculation unit 104A calculates the second offset on the basis of the first feature amount and the second feature amount extracted by the first feature amount extraction unit 101A and the second feature amount extraction unit 103A. Specifically, it is determined whether or not the first feature amount and the second feature amount satisfy a certain condition. In a case where the condition is satisfied, ½ of the sum of both of the feature amounts is calculated as the second offset. That is, an arithmetic average of both thereof is calculated as the second offset. The condition, in which the first feature amount and the second feature amount has to be satisfied, is that an absolute value of the difference between the first feature amount and the second feature amount is equal to or less than a threshold value and is kept equal to or less than the threshold value for a specified time or longer.

Figure 10:
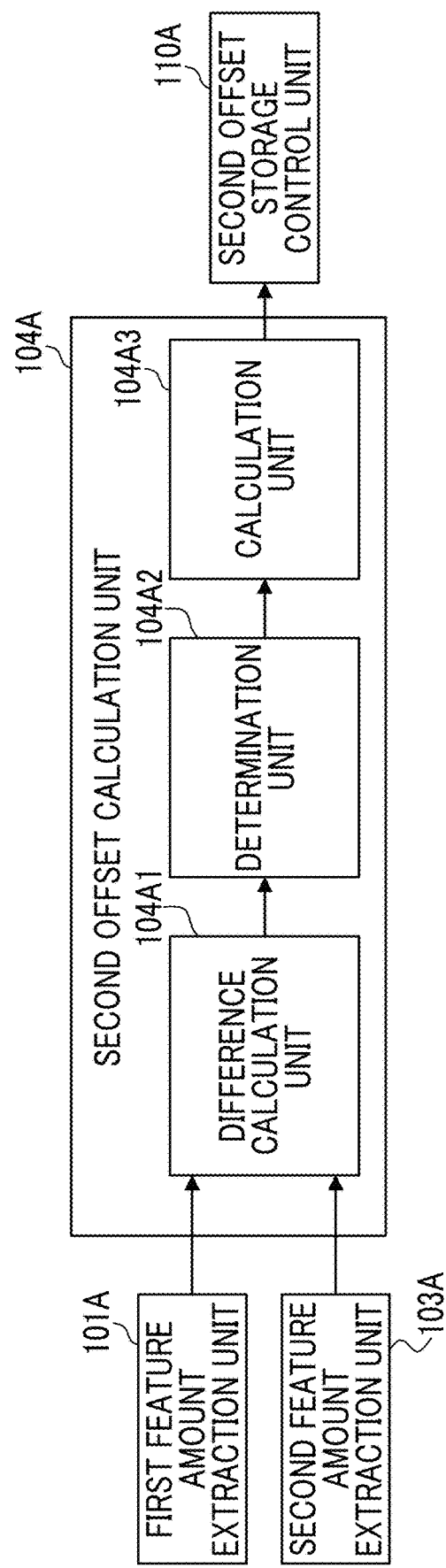
FIG. 10 is a block diagram of functions of the second offset calculation unit.

FIG. 10 is a block diagram of functions of the second offset calculation unit.

As shown in the drawing, the second offset calculation unit 104A has functions of a difference calculation unit 104A1, a determination unit 104A2, and a calculation unit 104A3.

The difference calculation unit 104A1 calculates the absolute value of the difference between the first feature amount and the second feature amount.

The determination unit 104A2 determines whether or not the absolute value of the difference between the first feature amount and the second feature amount calculated by the difference calculation unit 104A1 is equal to or less than the threshold value and is kept equal to or less than the threshold value for the specified time or longer. In such a case, first, the determination unit 104A2 determines whether or not the absolute value of the difference between the first feature amount and the second feature amount is equal to or less than the threshold value. In a case where it is determined that the absolute value is equal to or less than the threshold value, the determination unit 104A2 determines whether or not the absolute value is kept equal to or less than the threshold value for the specified time or longer. Consequently, in a case where the absolute value of the difference between the first feature amount and the second feature amount is equal to or less than the threshold value, the determination unit 104A2 counts (measures) a duration time thereof. The threshold value is an example of the first threshold value. The specified time is an example of the second threshold value. The threshold value and the specified time are predetermined and stored in the memory.

The calculation unit 104A3 calculates the second offset on the basis of the first feature amount and the second feature amount in a case where the determination unit 104A2 determines that the above-mentioned condition is satisfied. Specifically, the determination unit 104A2 calculates ½ of the sum of the first feature amount and the second feature amount at a time in a case where it is determined that the above-mentioned condition is satisfied, and calculates the second offset.

Figure 11:
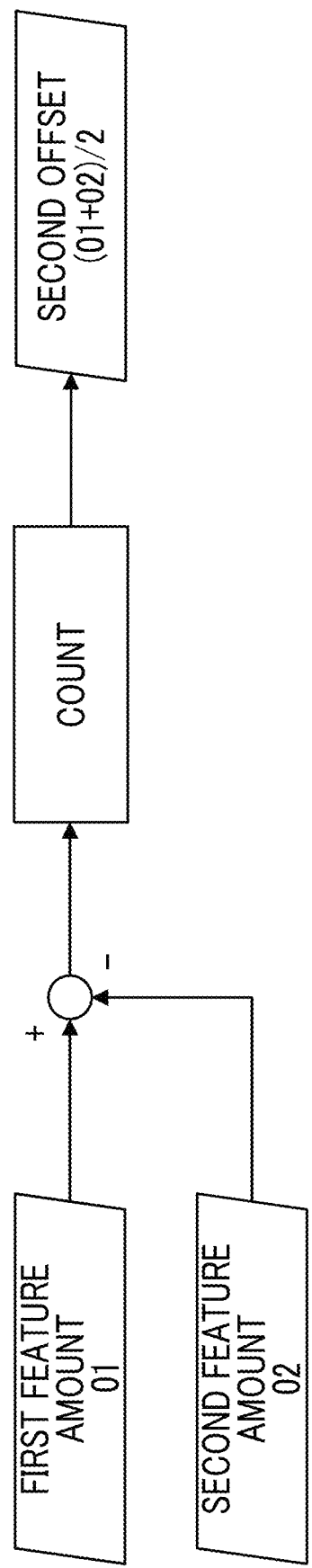
FIG. 11 is a conceptual diagram of calculation processing of a second offset performed by the second offset calculation unit.

FIG. 11 is a conceptual diagram of calculation processing of the second offset performed by the second offset calculation unit.

The first feature amount which is extracted by the first feature amount extraction unit 101A is O1, and the second feature amount which is extracted by the second feature amount extraction unit 103A is O2. Further, the specified time is represented as thresh_time, and the threshold value is represented as threshold.

First, the absolute value (|O2−O1|) of the difference between the first feature amount O1 and the second feature amount O2 is calculated.

In the count, |O2−O1| and the threshold are compared, and in a case where |O2−O1|<threshold, the count is incremented by 1. In a case where |O2−O1|>threshold, the count is set to 0.

In a case where count>thresh_time, the second offset is calculated on the basis of the first feature amount O1 and the second feature amount O2 at the time point. That is, the following calculation is executed to calculate the second offset.

The second offset=$(O1+O2)/2$

In a case where the second offset is calculated, the processing relating to the calculation of the second offset is initialized (reset). That is, the filter processing is reset in the first feature amount extraction unit 101A. Further, in the second feature amount extraction unit 103A, a start position of the calculation is initialized. Specifically, the value is returned to t=0, and the initial value deg_out[0] is updated.

Further, in a case where the second offset is calculated, information about the calculated second offset is stored in the offset storage unit 90A by the second offset storage control unit 110A. That is, the information about the second offset which is stored in the offset storage unit 90A is updated. Thereby, the information about the second offset which is stored in the offset storage unit 90A is maintained up to date. The initial value of the second offset which is stored in the offset storage unit 90A is 0.

As described above, in the present embodiment, in a case where the two feature amounts (first feature amount and second feature amount) relating to the offset are extracted from the output signal of the first detection unit 20A and the two extracted feature amounts satisfy a certain condition, the second offset is obtained from the two feature amounts. That is, in a case where the two feature amounts substantially coincide with each other, ½ of a sum thereof is calculated to obtain the second offset. The determination which is performed by the determination unit 104A2 is to determine whether or not the first feature amount and the second feature amount coincide with each other. That is, in a case where the absolute value of the difference between the first feature amount and the second feature amount is equal to or less than the threshold value (equal to or less than the first threshold value) and is kept equal to or less than the threshold value for the specified time or longer (the second threshold value or higher), the second offset is calculated on the assumption that the first feature amount and the second feature amount coincide with each other.

In such a manner, the second offset can be accurately obtained by obtaining the two feature amounts and obtaining the second offset. That is, it is difficult to obtain an accurate second offset using only one feature amount, but it is possible to accurately obtain the second offset by using the two feature amounts.

For example, consider a case where the second offset is obtained only from the first feature amount. In such a case, since there are variations in the signals after the filter processing, it is difficult to accurately estimate the second offset.

In a similar manner, consider a case where the second offset is obtained only from the second feature amount. As shown in Expression (2), the angular signal includes $\int (g(t))dt$ and $\int (f(t))dt$ as a function of the time t. Therefore, in a case where the second offset (the gradient of the accumulated integral value) is obtained only from the angular signal, an accurate value may not be necessary due to the effect of the function $[\int (g(t))dt + \int (f(t))dt]$ of the time t.

However, in a case where both values substantially coincide with each other, it is considered that this case indicates an accurate offset value. Consequently, the second offset can be accurately obtained by obtaining the second offset from the two feature amounts.

The first feature amount is extracted by subjecting the output signal (angular velocity signal) of the first detection unit 20A to the filter processing. The reason is that, in a case where the integral value (angular signal) of the output signal of the first detection unit 20A is subjected to filter processing, the value of the offset O, which is a feature amount originally desired to be obtained, may change.

[Processing of Camera Shake Correction]

Figure 12:
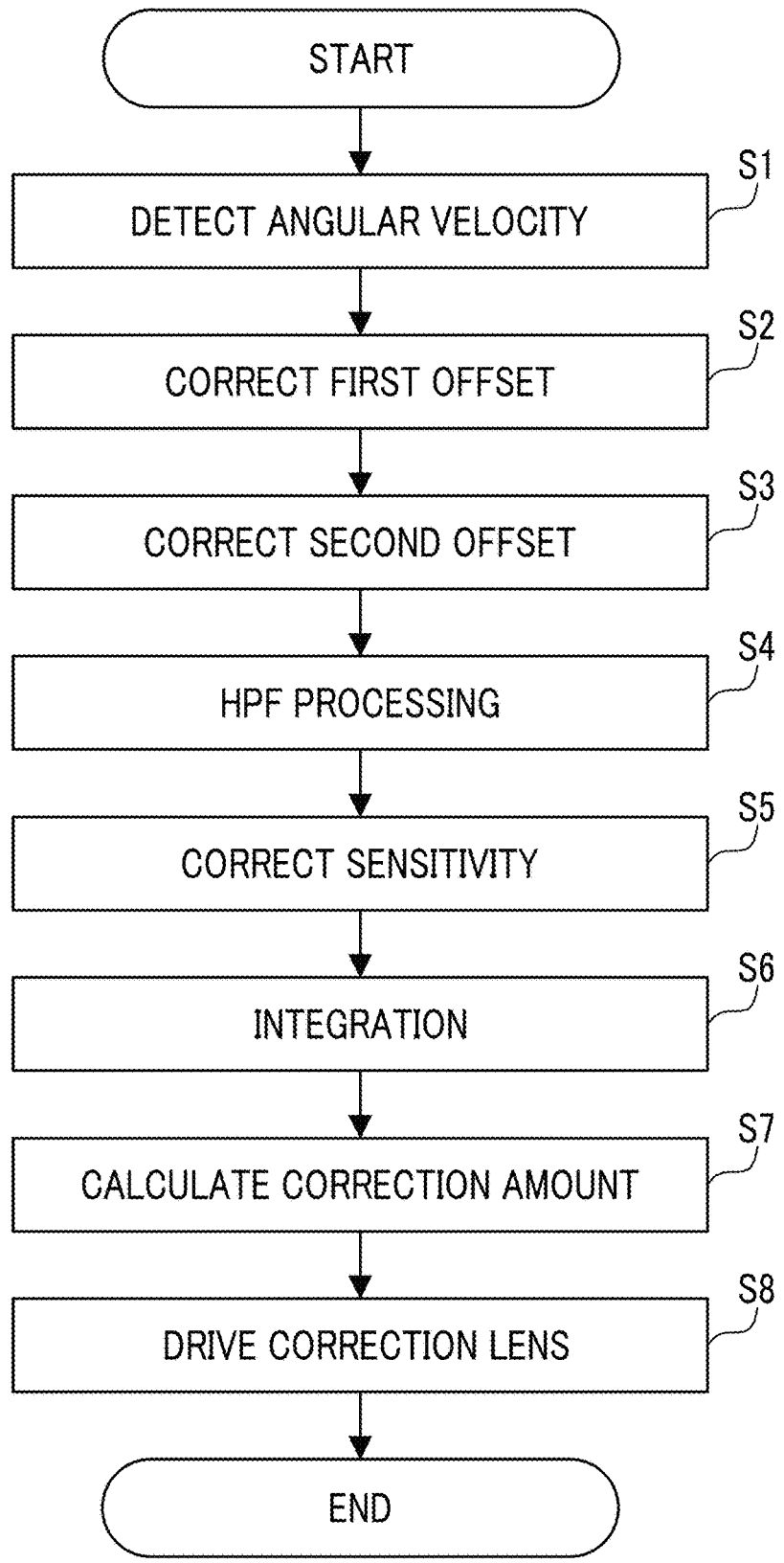
FIG. 12 is a flowchart showing a processing procedure of camera shake correction control.

FIG. 12 is a flowchart showing a processing procedure of camera shake correction control.

In a case where blurring occurs in the digital camera body, an angular velocity corresponding to the amount of blurring is detected by the first detection unit 20A and the second detection unit 20B (step S1). The first detection unit 20A and the second detection unit 20B detect the angular velocity in the yaw direction and the pitch direction with the gyro sensors 21A and 21B. The angular velocity signals detected by the gyro sensors 21A and 21B are converted into digital signals by the ADCs 22A and 22B and the signals are output.

First, the first offset is subtracted from the signals which are output from the first detection unit 20A and the second detection unit 20B (step S2). As described above, the first offset is a standard offset and is an offset in which a chronological change or the like is not taken into consideration.

Then, the signal from which the first offset is subtracted is subtracted from the second offset (step S3). The second offset is a latest offset. That is, the second offset is an offset in which the chronological change or the like is taken into consideration. By removing the second offset, it is possible to obtain an accurate angular velocity signal reflecting the current state.

Then, the signal from which the first offset and the second offset have been subtracted is subjected to high-pass filter processing (step S4). Then, the signal subjected to the high-pass filter processing is multiplied by the sensitivity and the sensitivity is corrected (step S5). The signal after the sensitivity correction is integrated, and the amount of blurring in the yaw direction and the pitch direction is calculated (step S6).

In a case where the amount of blurring in the yaw direction and the amount of blurring in the pitch direction is calculated, the amount of correction in the x axis direction and the y axis direction of the correction lens 13 is calculated on the basis of the calculated amount of blurring in each of the calculated directions (step S7). On the basis of the calculated correction amount, the first driving unit 17x and the second driving unit 17y are driven to correct the blurring (step S8).

[Calculation Processing of Second Offset]

Figure 13:
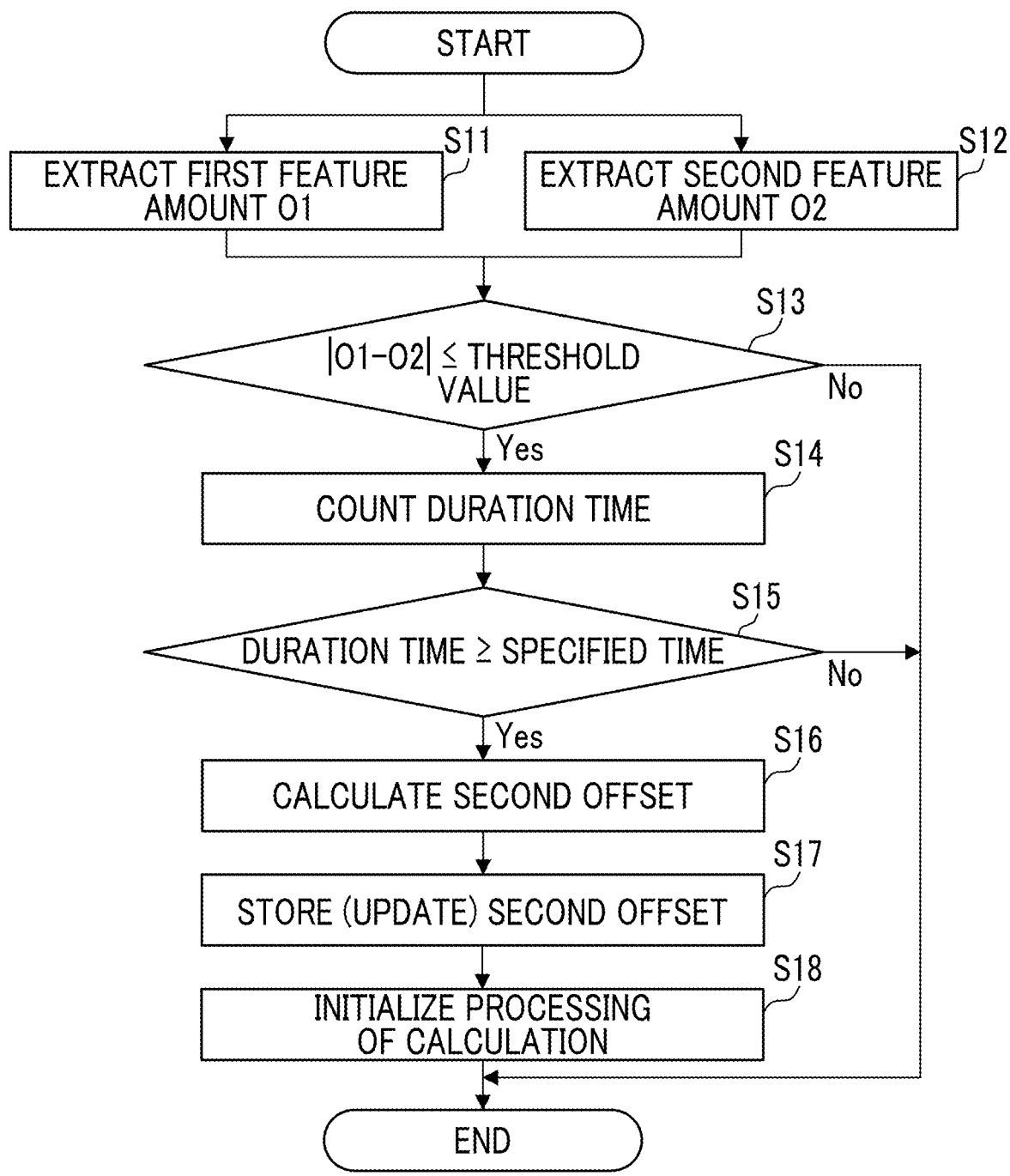
FIG. 13 is a flowchart showing a processing procedure of the second offset calculation.

FIG. 13 is a flowchart showing a processing procedure of the calculation of the second offset.

First, the first feature amount O1 and the second feature amount O2 are extracted from output signals of the first detection unit 20A and the second detection unit 20B (steps S11 and S12). The output signal described herein is an output signal after the first offset is removed.

The first feature amount O1 is extracted by subjecting the output signals of the first detection unit 20A and the second detection unit 20B to the predetermined filter processing. That is, the output signals of the first detection unit 20A and the second detection unit 20B are subjected to the low-pass filter processing or the band-pass filter processing so as to calculate the amount of direct current component to be extracted.

The second feature amount O2 is extracted by integrating the output signals of the first detection unit 20A and the second detection unit 20B and obtaining the gradient of the accumulated integral value thereof.

Next, the absolute value (|O1−O2|) of the difference between the extracted first feature amount O1 and the second feature amount O2 is calculated and compared with the threshold value (threshold). That is, it is determined whether or not the absolute value (|O1−O2|) of the difference between the first feature amount O1 and the second feature amount O2 is equal to or less than the threshold value (step S13).

In a case where the absolute value (|O1−O2|) of the difference between the first feature amount O1 and the second feature amount O2 is determined to be equal to or less than the threshold value, the duration time thereof is counted (step S14). Then, it is determined whether or not the counted duration time is equal to or longer than the specified time (step S15).

In a case where it is determined that the absolute value is kept equal to or less than the threshold value for the specified time or longer, the second offset is calculated by assuming that the first feature amount O1 and the second feature amount O2 coincide with each other (step S16). That is, ½ of the sum of the first feature amount O1 and the second feature amount O2 at the time at which it is determined that the specified time or longer has passed is calculated and set as the value of the second offset.

In a case where the second offset is calculated, the value of the calculated second offset is stored in the offset storage units 90A and 90B (step S17). More specifically, the information about the second offset which is stored in the offset storage units 90A and 90B is rewritten. Through this processing, the information about the second offset which is stored in the offset storage units 90A and 90B is updated.

In a case where the calculated second offset value is stored in the offset storage units 90A and 90B, the processing relating to the calculation of the second offset is initialized (step S18). That is, the filter processing is reset for the calculation of the first feature amount, and the start position of the calculation is initialized for the calculation of the second feature amount.

The series of processing is repeatedly executed at regular intervals while the digital camera is operating. In a case where the second offset is not calculated during one calculation cycle (in a case where the difference between the first feature amount and the second feature amount does not satisfy the condition), the processing relating to the calculation is initialized, and the calculation is performed in the next cycle. In such a case, the detected value is maintained for the second offset.

As described above, in the present embodiment, the two feature amounts (first feature amount and second feature amount) relating to the offset are extracted, and the two feature amounts are compared to obtain the second offset. Therefore, the second offset can be obtained with high accuracy.

EXAMPLES (1) Example 1

Figure 14:
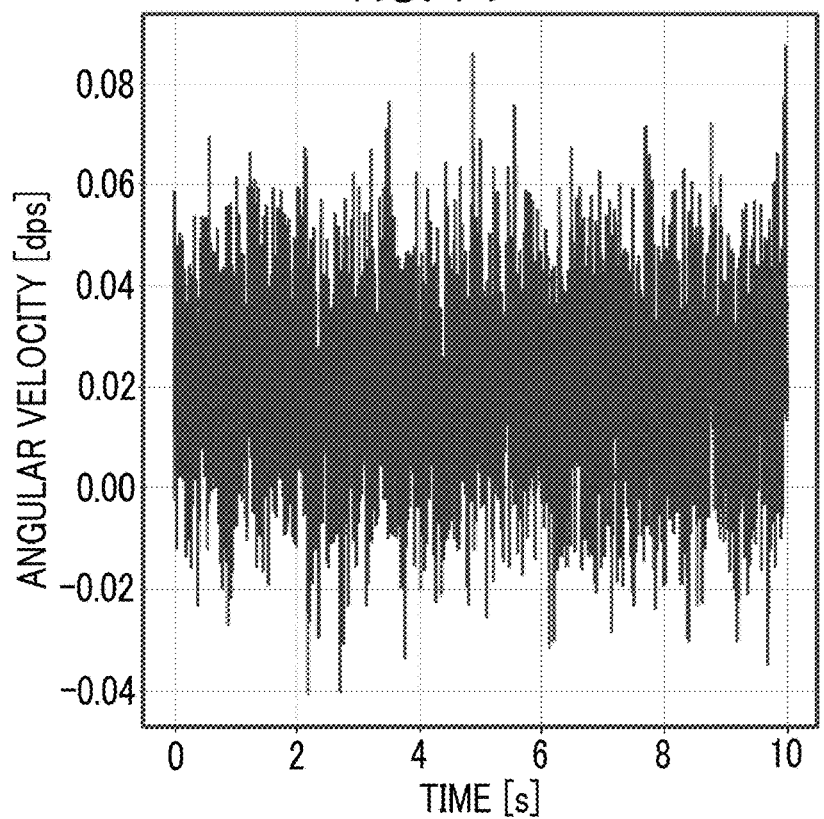
FIG. 14 is a diagram showing an example of an output signal of a gyro sensor in a stationary state.

FIG. 14 is a diagram showing an example of the output signal of the gyro sensor in a stationary state.

The drawing shows the output signal of the gyro sensor in a case where the offset is 0.02 [dps]. The unit [dps] means "degree per second".

Figure 15:
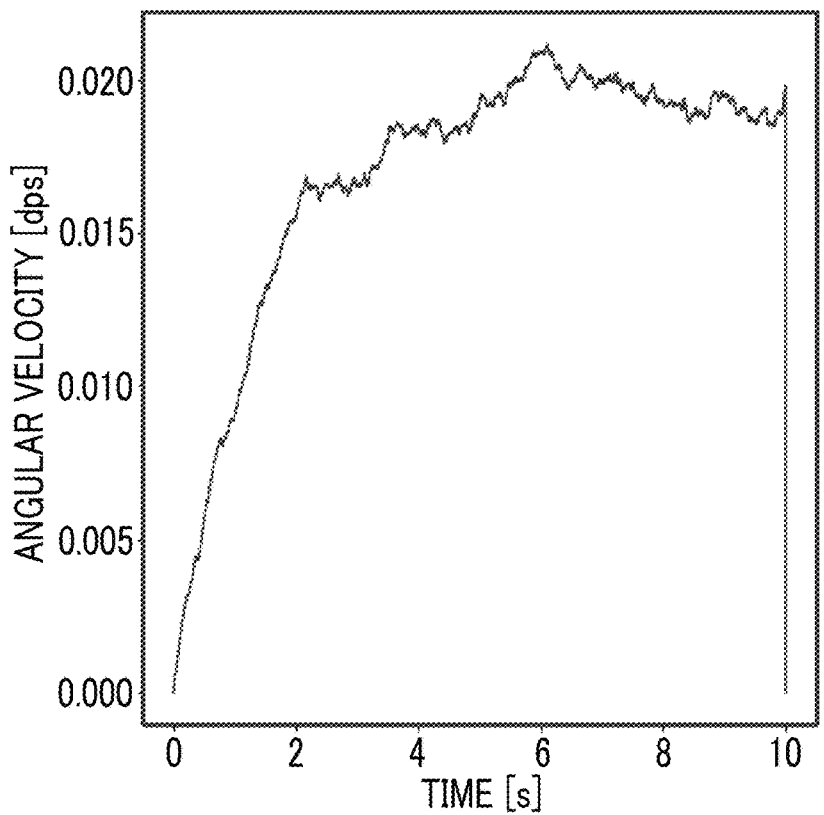
FIG. 15 is a diagram showing an extraction result of a first feature amount.

FIG. 15 is a diagram showing an extraction result of the first feature amount. That is, the result of extracting the amount of direct current component from the output signal of the gyro sensor shown in FIG. 14 is shown. In the present example, the cut-off frequency was set to 0.1 [Hz], and the output signal was subjected to low-pass filter processing to extract the first feature amount (amount of direct current component). As shown in the drawing, it can be seen that it is difficult to accurately feature the offset using only the first feature amount.

Figure 16:
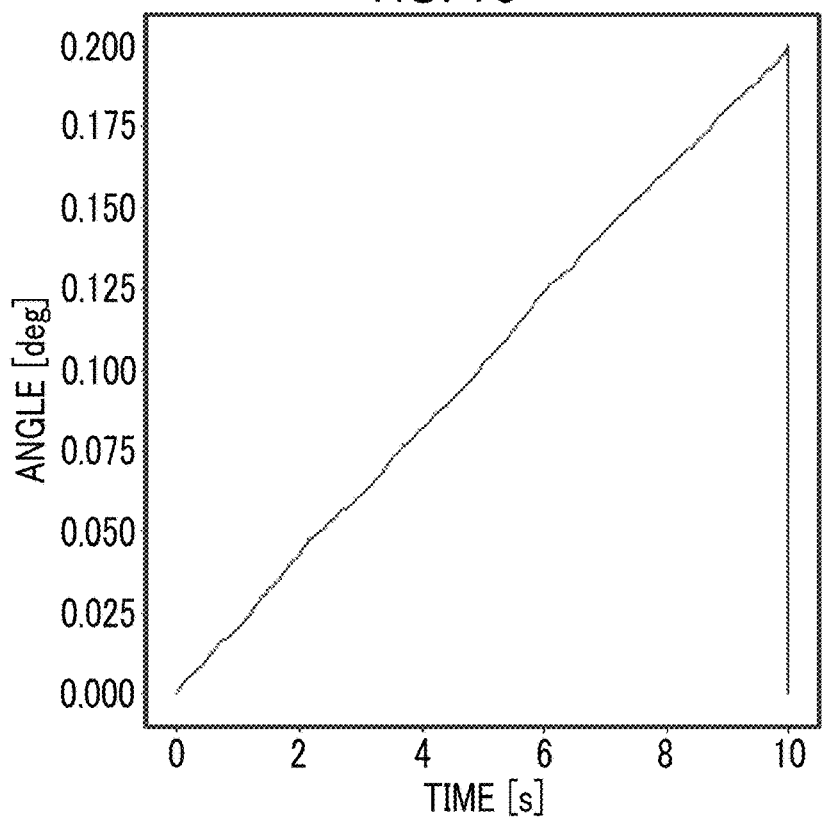
FIG. 16 is a diagram showing a calculation result of an integral value.

FIG. 16 is a diagram showing a calculation result of the integral value. That is, the result of integrating the output signal of the gyro sensor shown in FIG. 14 is shown. The angle is calculated by integrating the output signal of the gyro sensor. [Deg], which is a unit of an angle, means "degree". The second feature amount is calculated by calculating the gradient of the graph shown in the drawing.

Figure 17:
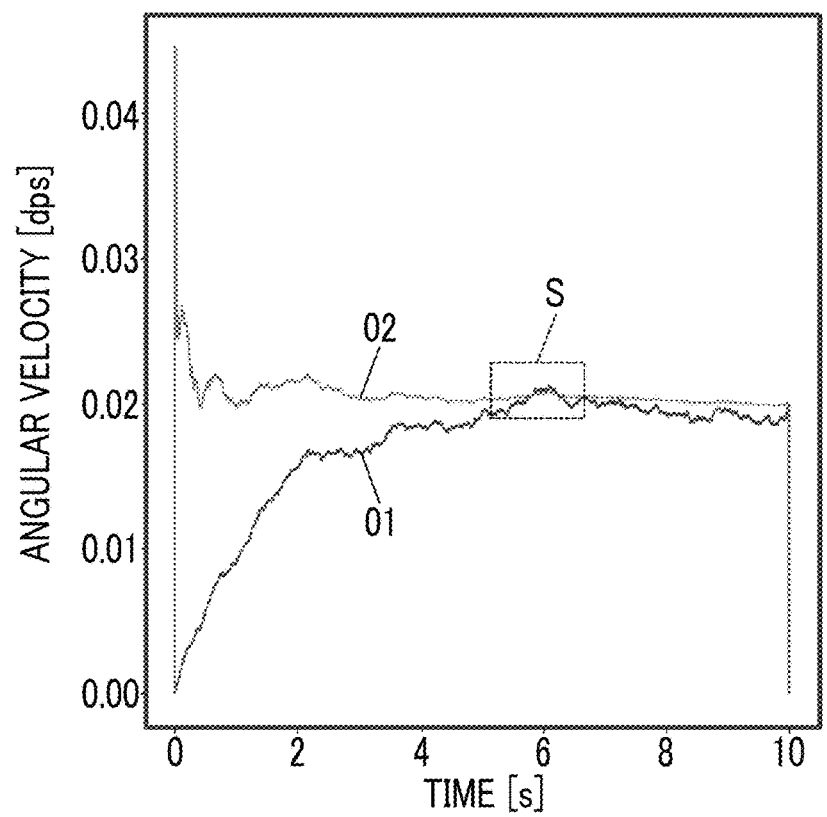
FIG. 17 is a diagram showing chronological change between the first feature amount and a second feature amount.

FIG. 17 is a diagram showing a chronological change between the first feature amount and the second feature amount. In the drawing, the reference numeral O1 indicates a chronological change of the first feature amount. Further, the reference numeral O2 indicates a chronological change in the second feature amount.

As shown in the drawing, it can be confirmed that the offset can be accurately specified by comparing the first feature amount O1 with the second feature amount O2. That is, it can be confirmed that the offset can be accurately specified by detecting a state in which both thereof coincide with each other. The coincidence between both thereof can be determined by detecting that the absolute value of the difference between both thereof is equal to or less than the threshold value continuously for the specified time or longer. For example, in FIG. 17, by detecting the state of the region S surrounded by the broken line, it is possible to detect that both thereof coincide with each other.

(2) Example 2

Here, it is verified whether or not an accurate offset can be detected even in a case where momentary vibration occurs.

Figure 18:
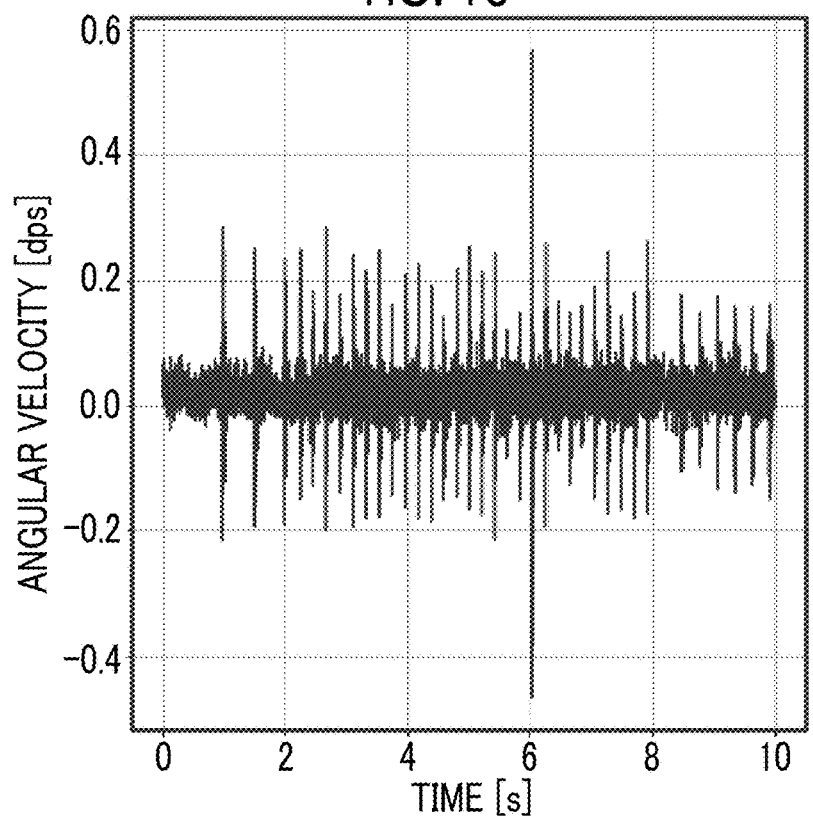
FIG. 18 is a diagram showing an example of an output signal of a gyro sensor in a case where momentary vibration occurs in a stationary state.

FIG. 18 is a diagram showing an example of the output signal of the gyro sensor in a case where momentary vibration occurs in the stationary state.

The drawing shows the output signal of the gyro sensor in a case where the offset is 0.02 [dps].

Figure 19:
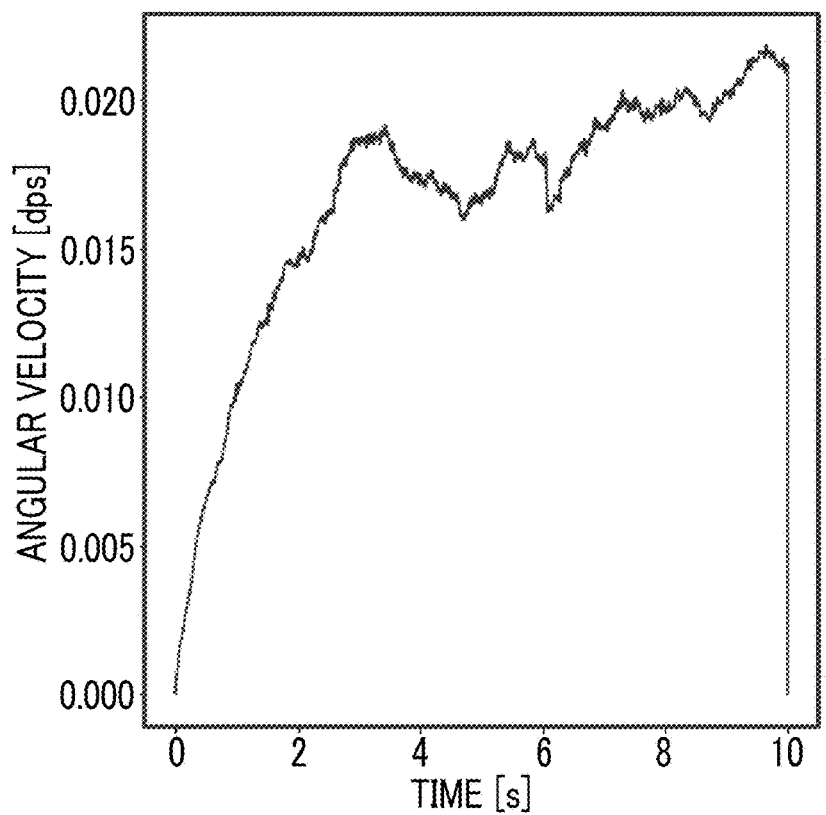
FIG. 19 is a diagram showing an extraction result of the first feature amount.

FIG. 19 is a diagram showing the extraction result of the first feature amount. That is, a result of extracting the amount of direct current component from the output signal of the gyro sensor shown in FIG. 18 is shown. In a similar manner to Example 1, the cut-off frequency was set to 0.1 [Hz], the output signal was subjected to low-pass filter processing, and the first feature amount was extracted. As shown in the drawing, it can be seen that it is difficult to accurately feature the offset using only the first feature amount.

Figure 20:
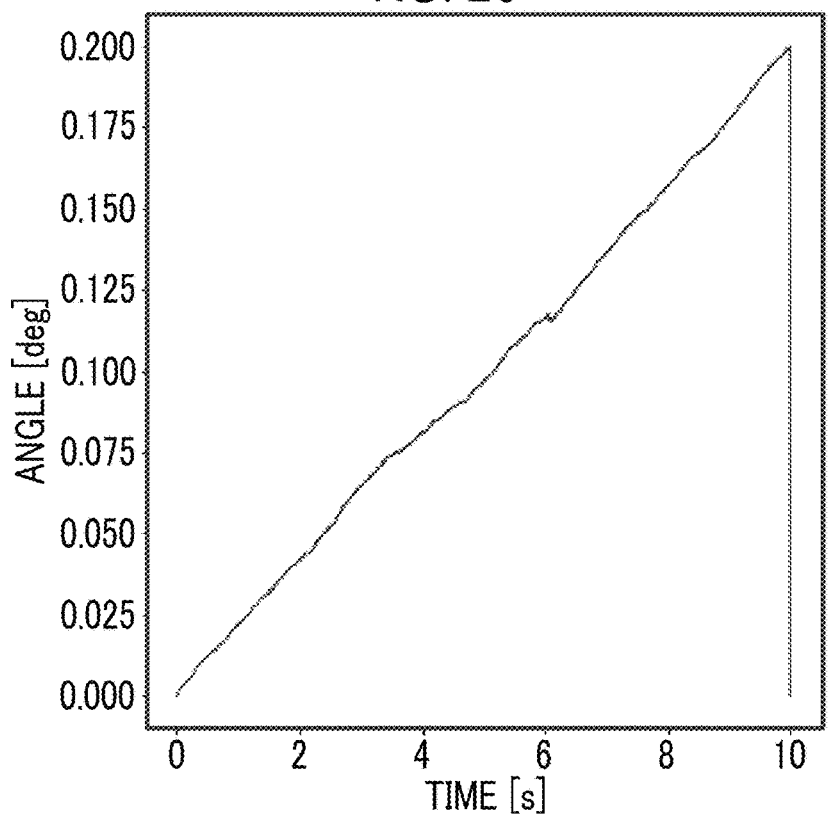
FIG. 20 is a diagram showing a calculation result of the integral value.

FIG. 20 is a diagram showing a calculation result of the integral value. That is, the result of integrating the output signal of the gyro sensor shown in FIG. 14 is shown. The second feature amount is calculated by calculating the gradient of the graph shown in the drawing.

Figure 21:
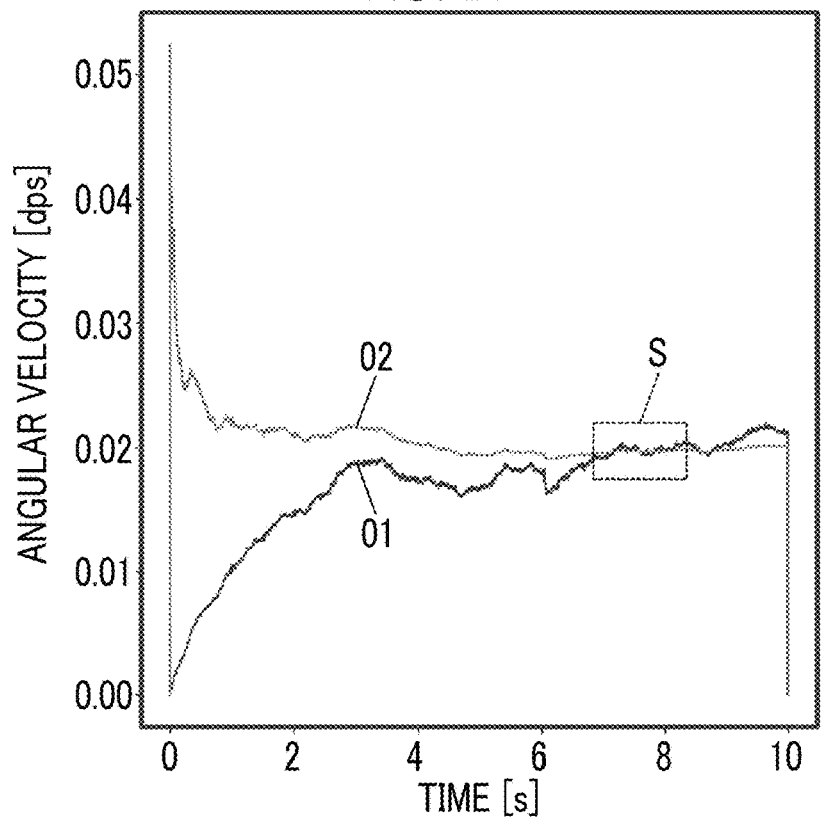
FIG. 21 is a diagram showing chronological change between the first feature amount and the second feature amount.

FIG. 21 is a diagram showing chronological change between the first feature amount and the second feature amount. In the drawing, the reference numeral O1 indicates a chronological change of the first feature amount. Further, the reference numeral O2 indicates a chronological change in the second feature amount.

As shown in the drawing, it can be confirmed that the offset can be accurately specified by comparing the first feature amount O1 with the second feature amount O2 even in a case where the momentary vibration occurs. That is, it can be confirmed that the offset can be accurately specified by detecting a state in which both thereof coincide with each other. In the present example, for example, by detecting the state of the region S surrounded by the broken line, it is possible to detect that both thereof coincide with each other.

(3) Example 3

Here, the effect of the cut-off frequency in extracting the first feature amount will be verified.

FIG. 22 is a diagram showing an example of the output signal of the gyro sensor in the stationary state.

The drawing shows the output signal of the gyro sensor in a case where the offset is 0.02 [dps]. The difference from the output signal in Example 1 is an output period of the signal. Example 1 shows an output signal for a period of 10 [s], whereas in the present example, an output signal for a period of 60 [s] is shown.

FIG. 23 is a diagram showing the extraction result of the first feature amount. That is, a result of extracting the amount of direct current component from the output signal of the gyro sensor shown in FIG. 22 is shown. In the present example, the cut-off frequency was set to 0.01 [Hz], the output signal was subjected to low-pass filter processing, and the first feature amount was extracted. That is, the first feature amount is extracted by lowering the cut-off frequency in contrast with Example 1. As shown in the drawing, by lowering the cut-off frequency, the first feature amount smoothly converges. On the other hand, it can be seen that it takes time to converge.

Figure 24:
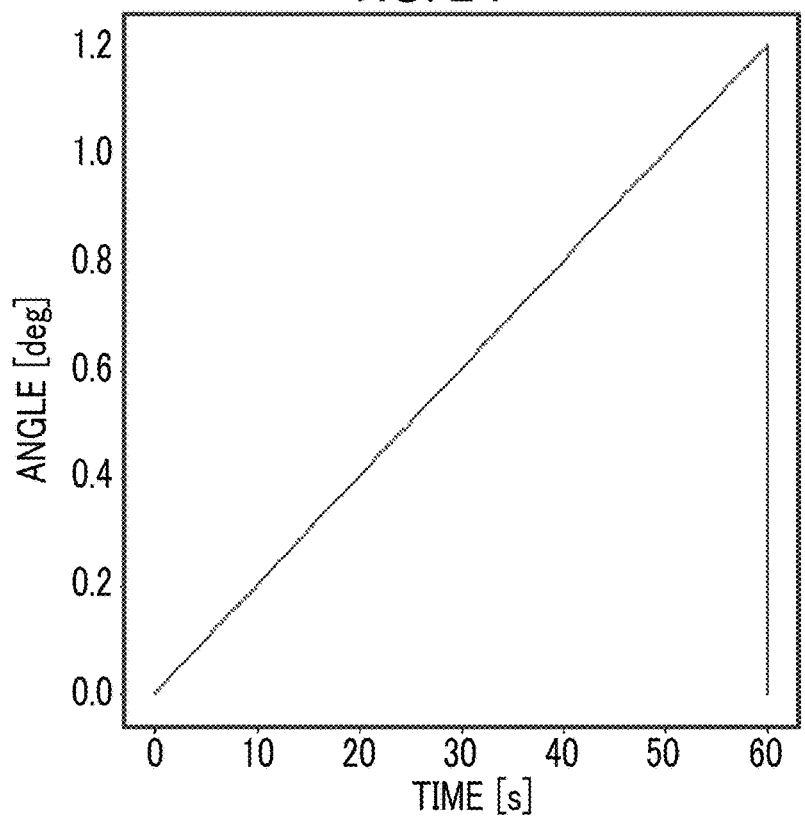
FIG. 24 is a diagram showing a calculation result of the integral value.

FIG. 24 is a diagram showing a calculation result of the integral value. That is, the result of integrating the output signal of the gyro sensor shown in FIG. 22 is shown. The second feature amount O2 is calculated by calculating the gradient of the graph shown in the drawing.

Figure 25:
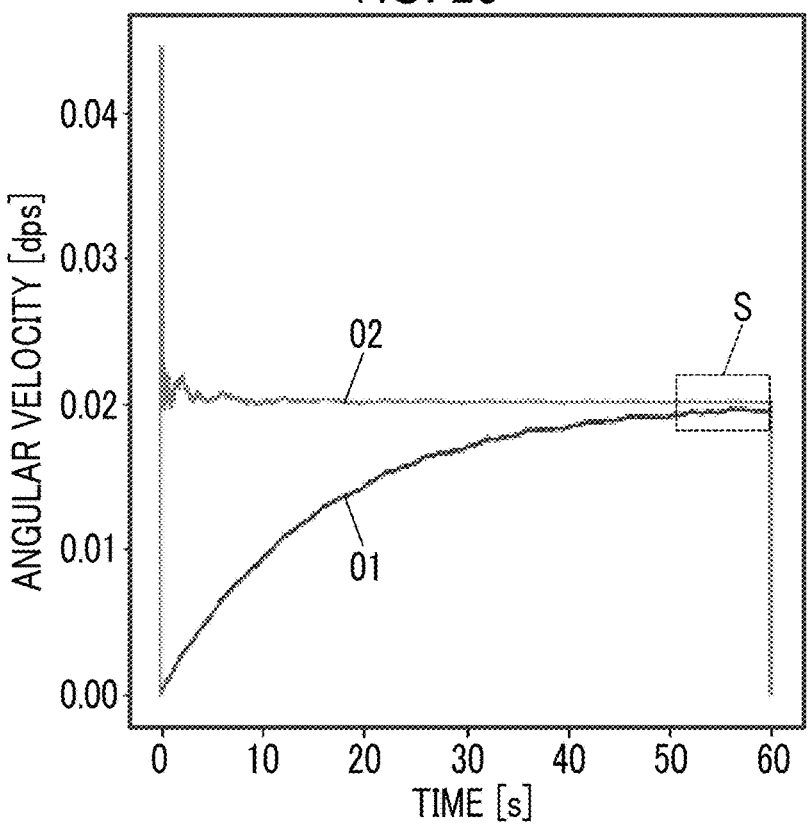
FIG. 25 is a diagram showing chronological change between the first feature amount and the second feature amount.

FIG. 25 is a diagram showing chronological change between the first feature amount and the second feature amount. In the drawing, the reference numeral O1 indicates a chronological change of the first feature amount. Further, the reference numeral O2 indicates a chronological change in the second feature amount.

As shown in the drawing, in a case where the cut-off frequency is lowered, it takes time for the first feature amount to converge. As a result, it can be seen that it takes time to detect a state in which the first feature amount O1 and the second feature amount O2 coincide with each other.

From the comparison between Examples 1 and 3, it can be seen that it is effective to increase the cut-off frequency in order to detect the coincidence state of the first feature amount and the second feature amount at an early stage.

On the other hand, in a case where the cut-off frequency is increased, it is difficult to accurately detect the coincidence state. This point can be dealt with by optimizing the threshold value and the specified time for which the state of the threshold value or less is to be satisfied. In a case where the specified time is shortened, the threshold value is set to be narrow. In a case where the threshold value is set to be wide, the specified time is set to be long.

(4) Example 4

Figure 26:
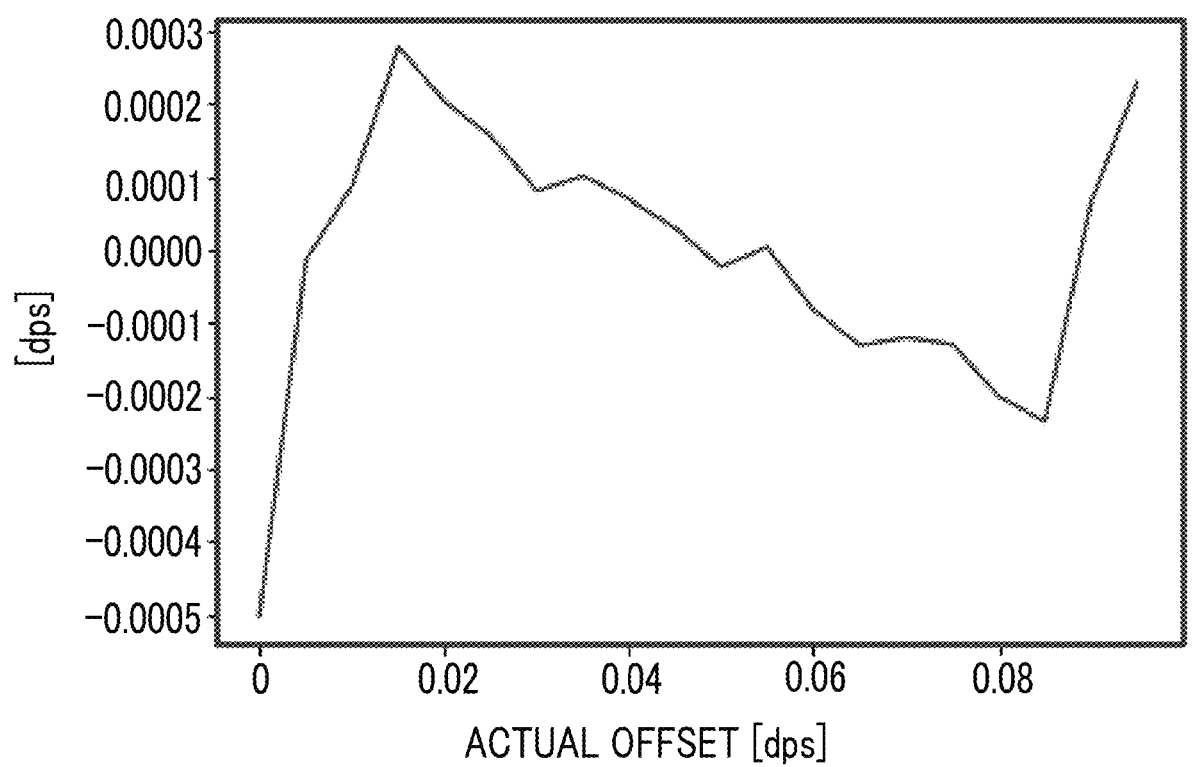
FIG. 26 is a diagram showing an estimation accuracy of the offset calculated by the method of the present invention.

FIG. 26 is a diagram showing an estimation accuracy of the offset calculated by the method of the present invention.

The drawing shows the estimation accuracy in the stationary state in which the offset ranges from 0.01 [dps] to 0.1 [dps]. The offset is calculated under the following conditions.

The cut-off frequency of the low-pass filter in extracting the first feature amount: 0.1 [Hz]

The threshold value of the absolute value of the difference between the first feature amount and the second feature amount: 0.001 [dps]

The duration time of the state of the threshold value or less (specified time): 10 [ms] As shown in the drawing, it can be confirmed that the offset can be calculated to be with an error within 0.001 [dps].

Second Embodiment

In the digital camera of the present embodiment, the stationary state of the digital camera body is detected. In a case where the stationary state is detected, the calculation processing of the second offset is executed.

Figure 27:
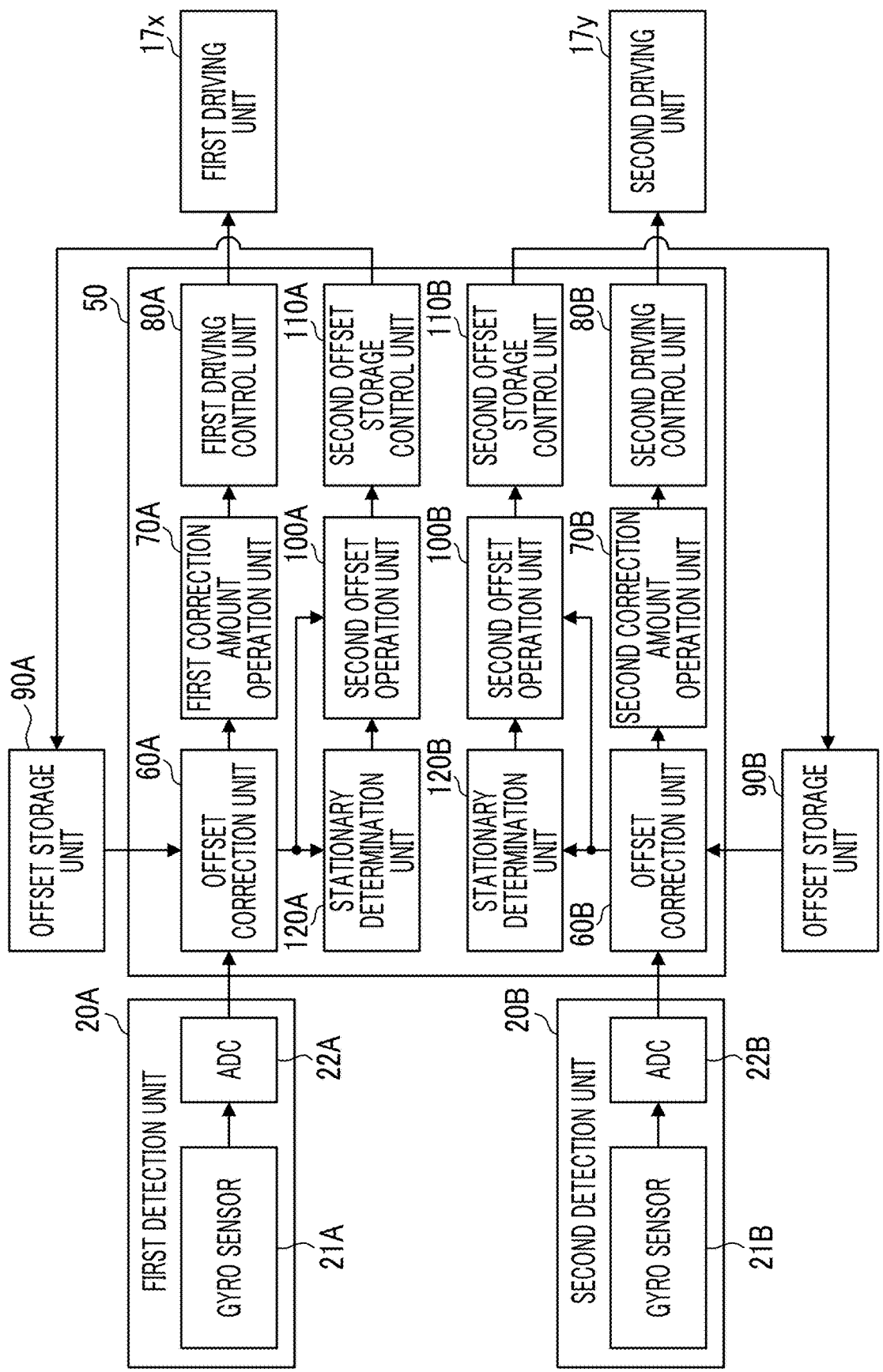
FIG. 27 is a block diagram of a main function relating to calculation of the second offset.

FIG. 27 is a block diagram of a main function relating to the calculation of the second offset.

As shown in the drawing, the digital camera of the present embodiment is different from the digital camera of the first embodiment in that the digital camera further includes the stationary determination units 120A and 120B. The functions of the stationary determination units 120A and 120B are implemented by the system control unit 50.

The stationary determination units 120A and 120B determine a stationary state on the basis of the output signals of the first detection unit 20A and the second detection unit 20B. That is, it is determined whether or not the digital camera body is stationary. In the present embodiment, in the offset correction units 60A and 60B, the low-pass filter processing or band-pass filter processing is performed on the output signals of the first detection unit 20A and the second detection unit 20B after the first offset is subtracted. Thereby, the stationary state is determined. That is, it is detected that the signal after the filter processing continues to be equal to or less than the threshold value for a certain time and thereby it is determined that the camera body is in the stationary state.

The second offset operation units 100A and 100B execute the calculation processing of the second offset in a case where the stationary determination units 120A and 120B determine that the camera body is in the stationary state.

In such a manner, in a case where the stationary state is determined, the second offset can be stably calculated by executing the processing relating to the calculation of the second offset.

In addition, the storage processing may be executed in a case where it is determined that the camera body is in the stationary state. That is, the calculation processing of the second offset may be constantly executed, and the calculated second offset may be stored (updated) in the offset storage units 90A and 90B in a case where it is determined that the camera body is in the stationary state. In such a case, in a case where it is determined that the camera body is in the stationary state, it is preferable to initialize (reset) the processing relating to the calculation of the second offset and start the calculation.

Modification Example

In a case where the calculation processing of the second offset is constantly executed and it is determined that the camera body is in the stationary state, a configuration may be made such that the cut-off frequency of the low-pass filter in extracting the first feature amount is switched, and the calculation processing of a second offset is executed. For example, in a normal state (non-stationary state), the first feature amount extraction unit performs low-pass filter processing at the first cut-off frequency to extract the first feature amount. On the other hand, in a case where it is determined that the camera body is in the stationary state, the low-pass filter processing is performed at the second cut-off frequency higher than the first cut-off frequency, and the first feature amount is extracted. In a case where it is determined that the camera body is in the stationary state, a stable signal is output. Therefore, even in a case where a high cut-off frequency is set, the first feature amount can be stably extracted. Thereby, the second offset can be calculated earlier.

Third Embodiment

It is possible that the offset may change during calculation of the offset. For example, in a case where an impact is applied to the digital camera body due to drop or the like, a situation may occur in which the offset changes. Here, a description will be given of a response to a case where the offset changes for some reason during the calculation of the offset.

Figure 28:
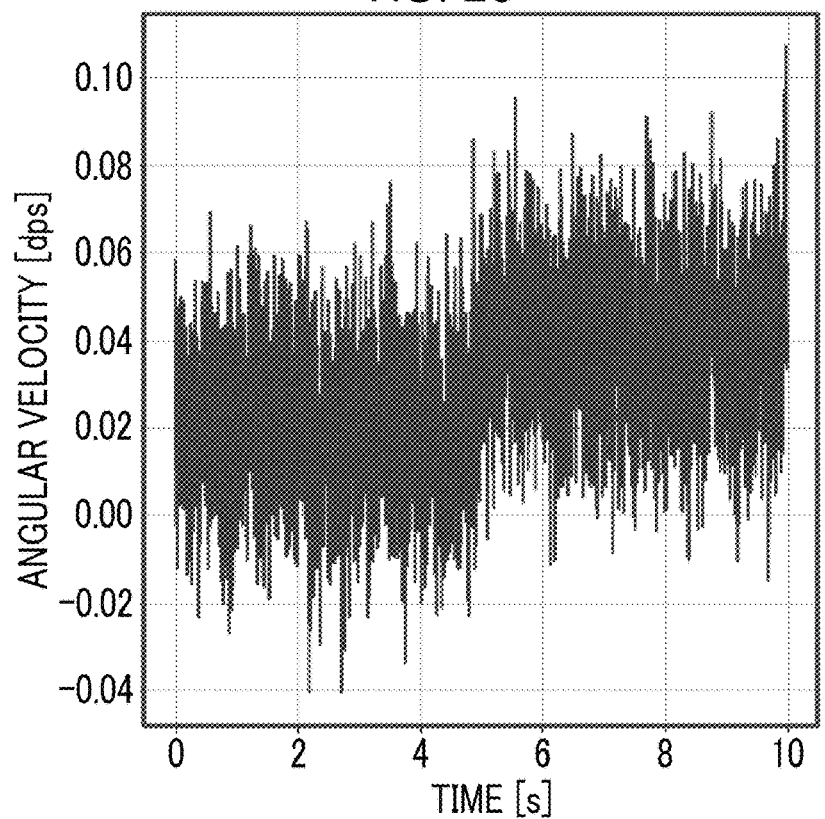
FIG. 28 is a diagram showing an example of an output signal of the gyro sensor in a case where the offset is changed in the stationary state.

FIG. 28 is a diagram showing an example of the output signal of the gyro sensor in a case where the offset changes in the middle of the stationary state.

The drawing shows the output signal of the gyro sensor in a case where the offset changes from 0.02 [dps] to 0.04 [dps] in the middle of the stationary state.

Figure 29:
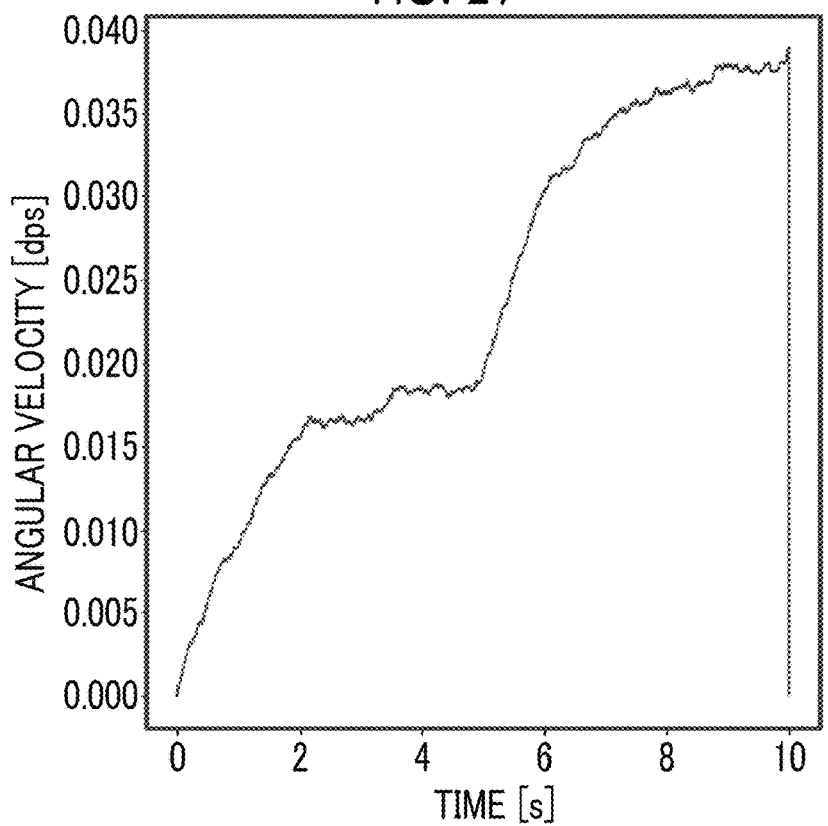
FIG. 29 is a diagram showing a result of extracting the first feature amount from the output signal of the gyro sensor shown in FIG. 28.

FIG. 29 is a diagram showing a result of extracting the first feature amount from the output signal of the gyro sensor shown in FIG. 28. In the present example, the cut-off frequency was set to 0.1 [Hz], the output signal was subjected to the low-pass filter processing, and the first feature amount was extracted. As shown in the drawing, it can be seen that in a case where the offset changes in the middle thereof, the signal gradually converges toward the changed offset.

Figure 30:
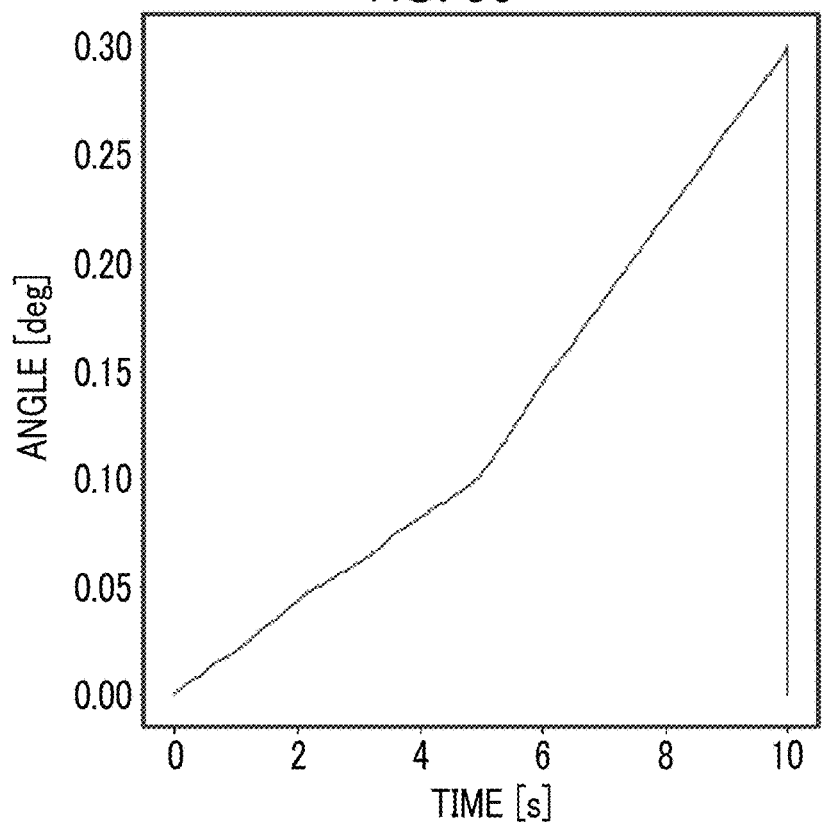
FIG. 30 is a diagram showing a result of integrating the output signal of the gyro sensor shown in FIG. 28.

FIG. 30 is a diagram showing a result of integrating the output signal of the gyro sensor shown in FIG. 28. As shown in the drawing, it can be seen that in a case where the offset changes in the middle thereof, the gradient changes in the middle. As described above, the second feature amount O2 is calculated by O2=(deg_out[t]−deg_out[0])/Time_out. Therefore, in a case where the gradient changes in the middle thereof, it is difficult to accurately calculate the second feature amount.

Figure 31:
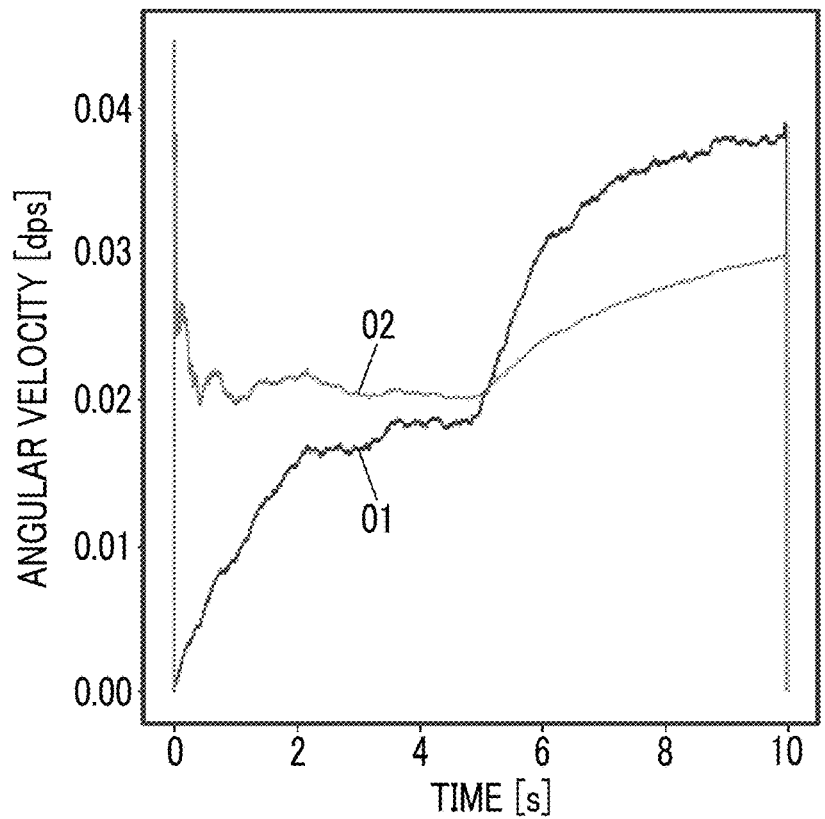
FIG. 31 is a diagram showing chronological change between the first feature amount and the second feature amount.

FIG. 31 is a diagram showing chronological change between the first feature amount and the second feature amount. In the drawing, the reference numeral O1 indicates a chronological change of the first feature amount. Further, the reference numeral O2 indicates a chronological change in the second feature amount. As shown in the drawing, in a case where the offset changes in the middle thereof, it is difficult to accurately calculate the second feature amount O2.

Consequently, in a case where the offset is changed during the calculation of the offset, it is preferable to initialize the processing relating to the calculation of the offset at that point and to redo the processing of calculating the offset.

In the digital camera of the present embodiment, the second offset operation units 100A and 100B each have a calculation initialization function. The digital camera of the present embodiment is the same as the digital camera of the first or second embodiment except that the second offset operation units 100A and 100B each have an initialization function. The functions of the two second offset operation units 100A and 100B are the same. Consequently, here, only the functions of the second offset operation unit 100A will be described.

Figure 32:
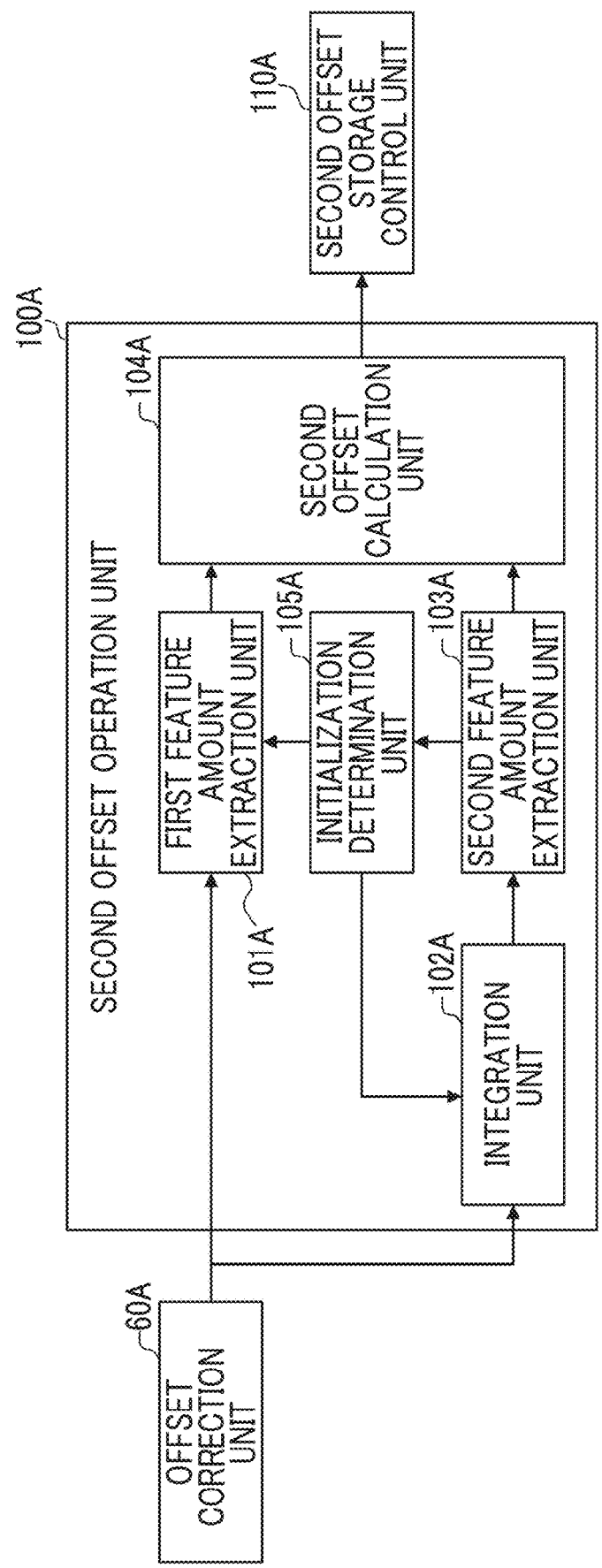
FIG. 32 is a block diagram of functions of the second offset operation unit.

FIG. 32 is a block diagram of the functions of the second offset operation unit according to the present embodiment.

As shown in the drawing, the second offset operation unit 100A of the present embodiment further has a function of the initialization determination unit 105A.

The initialization determination unit 105A determines whether or not it is necessary for the processing relating to the calculation of the second offset to be initialized on the basis of the second feature amount extracted by the second feature amount extraction unit 103A. An amount of change in the second feature amount (gradient of the accumulated integral value) extracted by the second feature amount extraction unit 103A is calculated. In a case where the calculated amount of change is greater than the threshold value, it is determined that initialization is necessary. The amount of change in the second feature amount is calculated by differentiating the second feature amount. The initialization determination unit 105A determines that initialization is necessary in a case where the value obtained by differentiating the second feature amount continuously converts within a certain range and then is greater than a threshold value (third threshold value).

Figure 33:
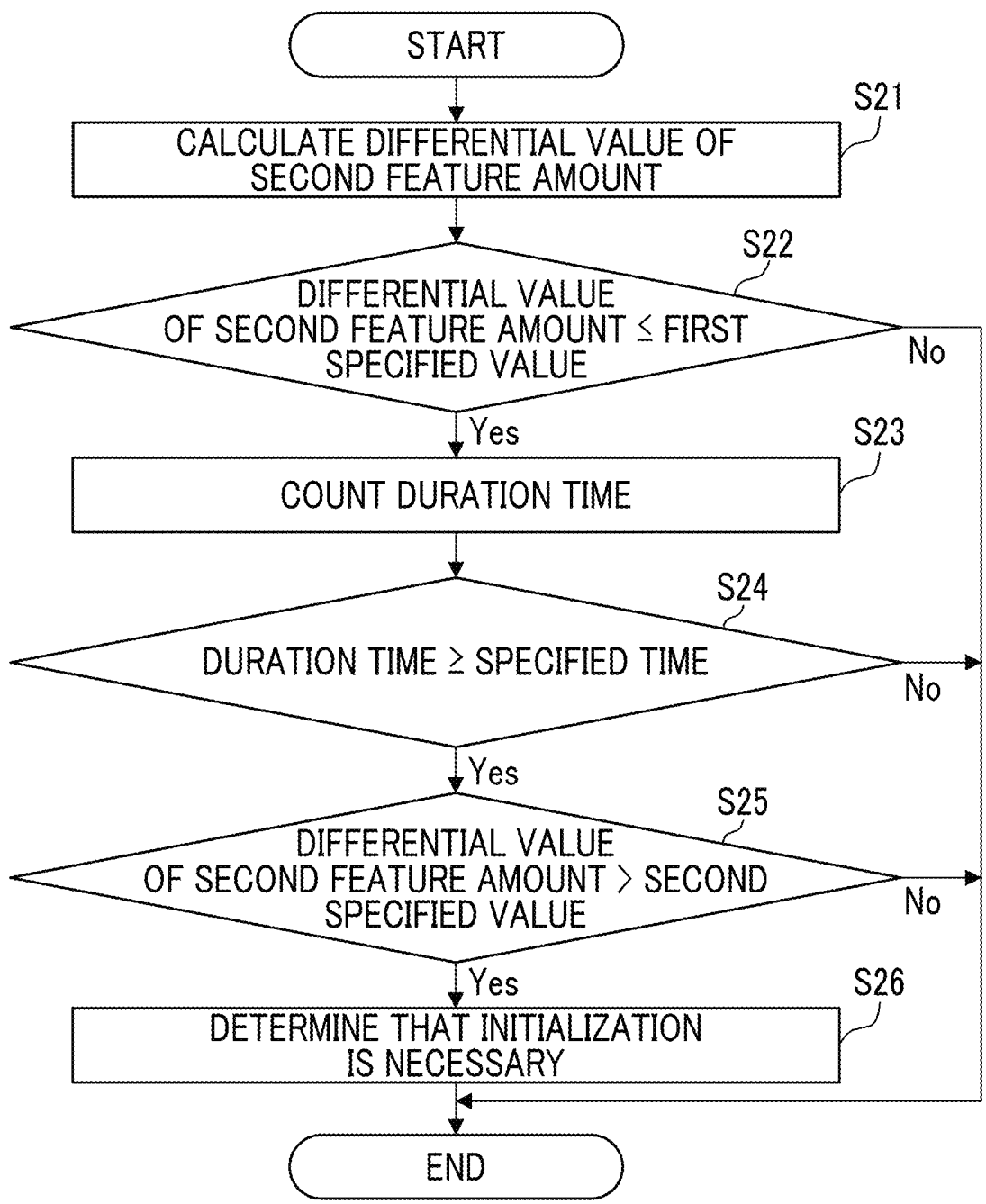
FIG. 33 is a flowchart showing a procedure of a processing of determination performed by the initialization determination unit.

FIG. 33 is a flowchart showing a procedure of the processing of determination performed by the initialization determination unit.

First, the second feature amount which is extracted by the second feature amount extraction unit 103A is differentiated (step S21). Thereby, the amount of change in the second feature amount is calculated.

Next, it is determined whether or not the calculated differential value of the second feature amount is equal to or less than a first specified value which is determined in advance (step S22). In a case where the calculated differential value of the second feature amount is equal to or less than the first specified value, the duration time thereof is counted (step S23). That is, the time during which the state of the first specified value or less continues is counted. Then, it is determined whether or not the counted duration time is equal to or longer than the specified time which is determined in advance (step S24). That is, it is determined whether or not the change is continuously made within the certain range.

In a case where it is determined that the state of the first specified value or less continues for the specified time or longer, it is determined whether or not the differential value of the second feature amount is greater than a second specified value which is determined in advance (step S25). The second specified value is an example of the third threshold value.

The case where the differential value of the second feature amount is greater than the second specified value is a case where the amount of change in the second feature amount is equal to or greater than the threshold value (third threshold value). In such a case, the offset is changed.

Therefore, in a case where the differential value of the second feature amount is greater than the second specified value, it is determined that initialization of the processing relating to the calculation of the second offset is necessary (step S26).

In a determination that the initialization determination unit 105A determines that initialization of the processing relating to the calculation of the second offset is necessary, the calculation processing of the first feature amount extraction unit 101A and the second feature amount extraction unit 103A is initialized. That is, the filter processing is reset for the calculation of the first feature amount. Further, the start position of the calculation is initialized for the calculation of the second feature amount.

Thereby, even in a case where the offset is changed during the calculation of the offset, it is possible to prevent the second offset from being updated with an erroneous numerical value. Further, in a case where the offset changes, the calculation processing is immediately initialized and the recalculation is started. Therefore, it is possible to quickly respond to the change.

In the present embodiment, the change of the second offset is detected from the amount of change of the second feature amount, but the method of detecting the change of the second offset is not limited to this. For example, as shown in the graph of FIG. 31, in a case where the offset changes, the values of the first feature amount and the second feature amount change in different forms from each other. Consequently, the change in the offset can be estimated from the two forms of the change in the feature amount.

Fourth Embodiment

As described above, the method of converging the first feature amount changes depending on the cut-off frequency at the time of extraction. That is, in a case where the cut-off frequency is lowered, smooth convergence occurs. On the other hand, it takes time to converge (refer to FIGS. 15 and 23).

In the digital camera of the present embodiment, the cut-off frequency is switched stepwise in a case where the first feature amount is extracted. More specifically, the cut-off frequency is gradually lowered such that the first feature amount is extracted.

Figure 34:
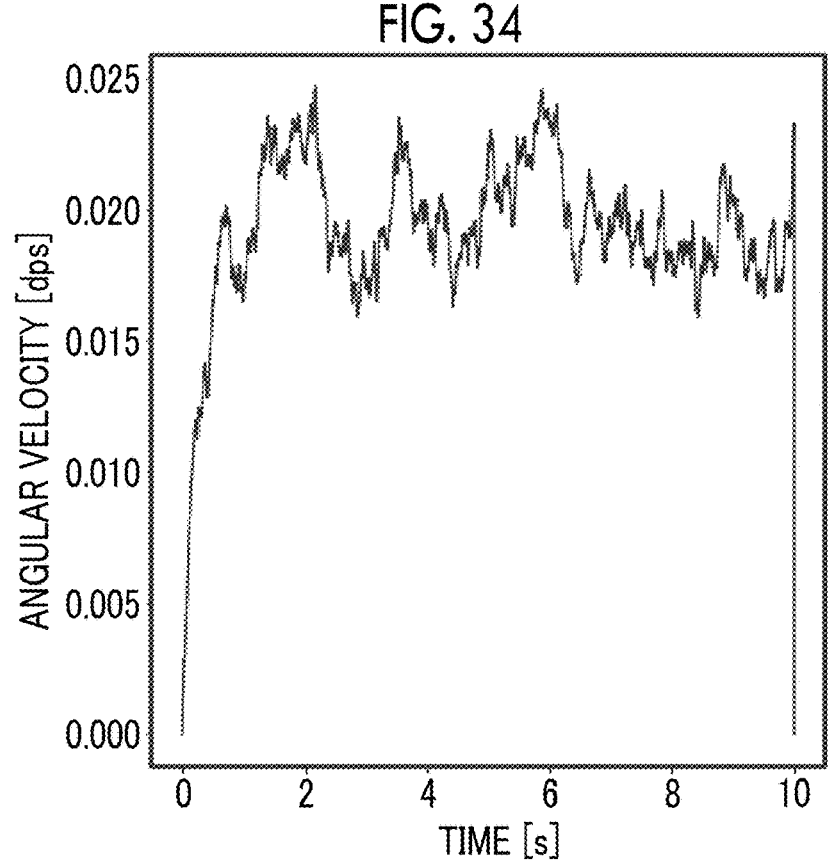
FIG. 34 is a diagram showing an extraction result of the first feature amount in a case where a cut-off frequency is switched stepwise.

FIG. 34 is a diagram showing an extraction result of the first feature amount in a case where the cut-off frequency is switched stepwise. The drawing shows an example in which a first feature amount is extracted by stepwise switching the cut-off frequency with respect to the output signal of the gyro sensor shown in FIG. 14. In the present example, the first feature amount is extracted by gradually lowering the cut-off frequency at certain time intervals. Specifically, the first feature amount is extracted by gradually lowering the cut-off frequency in order of 0.5 [Hz], 0.1 [Hz], 0.05 [Hz], and 0.01 [Hz].

As shown in the drawing, by stepwise lowering the cut-off frequency and extracting the first feature amount, it is possible to accelerate the convergence although the convergence is rough.

Figure 35:
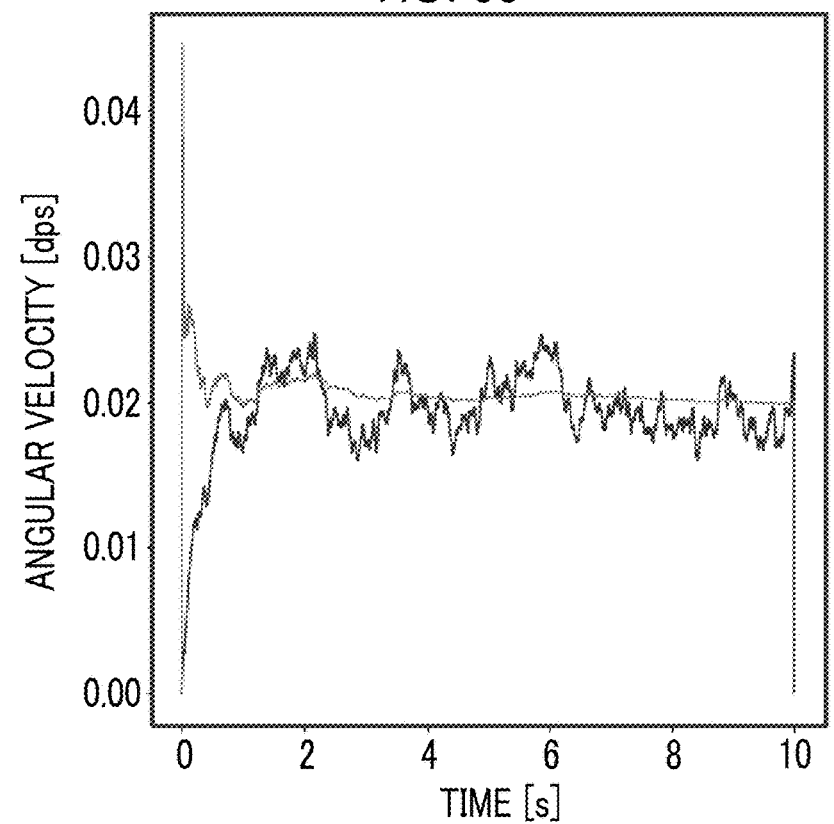
FIG. 35 is a diagram showing chronological change between the first feature amount and the second feature amount in a case where the first feature amount extracted by switching the cut-off frequency stepwise is used.

FIG. 35 is a diagram showing chronological change between the first feature amount and the second feature amount in a case where the first feature amount extracted by switching the cut-off frequency stepwise is used. In the drawing, the reference numeral O1 indicates a chronological change of the first feature amount. Further, the reference numeral O2 indicates a chronological change in the second feature amount.

As described above, by performing the extraction by gradually lowering the cut-off frequency, the first feature amount can be converged at an early stage although the convergence is rough. Consequently, in a case where the cut-off frequency is gradually lowered to extract the first feature amount as in the present example, it can be used in a case where the offset is quickly and roughly extracted.

Figure 36:
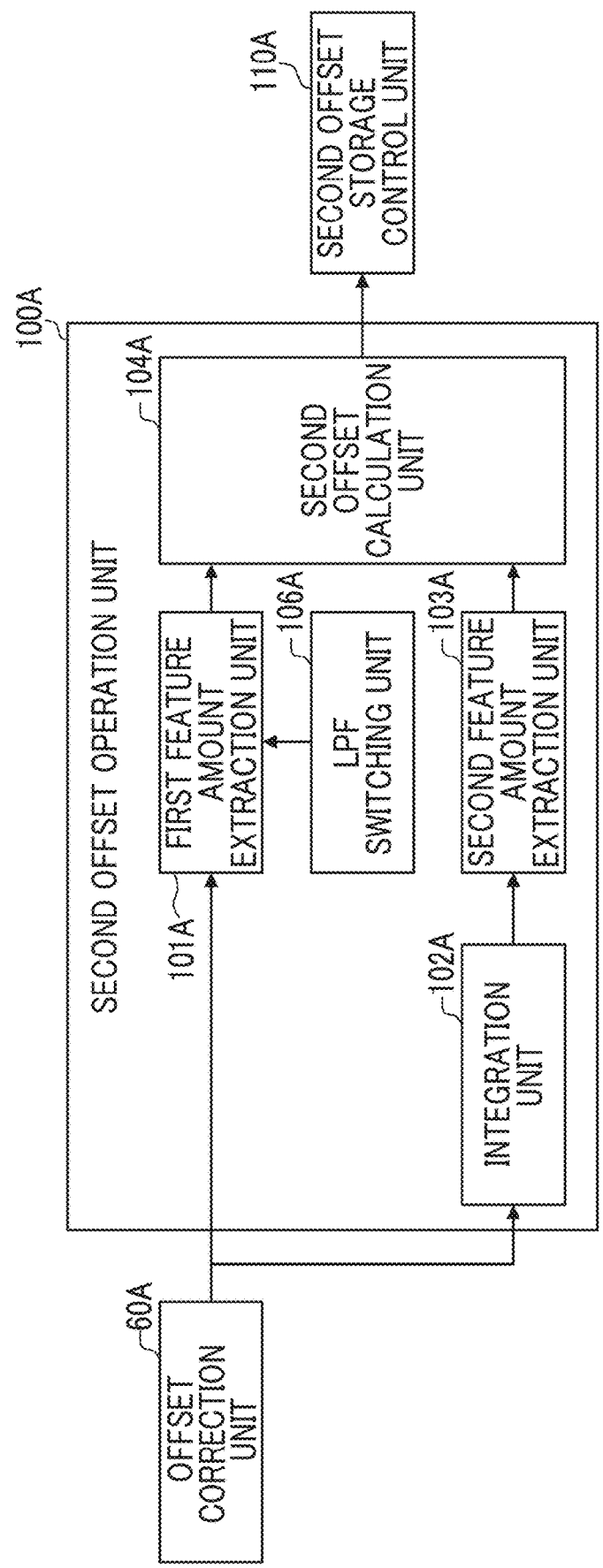
FIG. 36 is a block diagram of functions of the second offset operation unit.

FIG. 36 is a block diagram of functions of the second offset operation unit according to the present embodiment.

Since the functions of the two second offset operation units 100A and 100B are the same, only the functions of the second offset operation units 100A will be described herein.

As shown in FIG. 36, the second offset operation unit 100A of the present embodiment further has a function of an LPF switching unit 106A (LPF: Low-pass filter).

The LPF switching unit 106A switches the low-pass filter which is used in the first feature amount extraction unit 101A. More specifically, the cut-off frequency in the low-pass filter processing which is performed by the first feature amount extraction unit 101A is switched. The switching is performed stepwise at the time intervals which are determined in advance. The cut-off frequency to be switched is determined in advance and is set to be gradually lowered.

According to the second offset operation unit 100A of the present embodiment configured as described above, in the first feature amount extraction unit 101A, the cut-off frequency is switched stepwise such that the first feature amount is extracted. The number of times of switching is not particularly limited. It suffices that switching performed at least once.

Fifth Embodiment

As described above, the offset of the gyro sensor also fluctuates depending on the ambient temperature. In the digital camera of the present embodiment, the offset is controlled for each temperature. Therefore, in the digital camera of the present embodiment, in a case where the offset is calculated, the temperature information is acquired and the calculated offset is stored for each temperature. Further, in a case of the offset correction, the correction processing is executed using an offset corresponding to the temperature.

Figure 37:
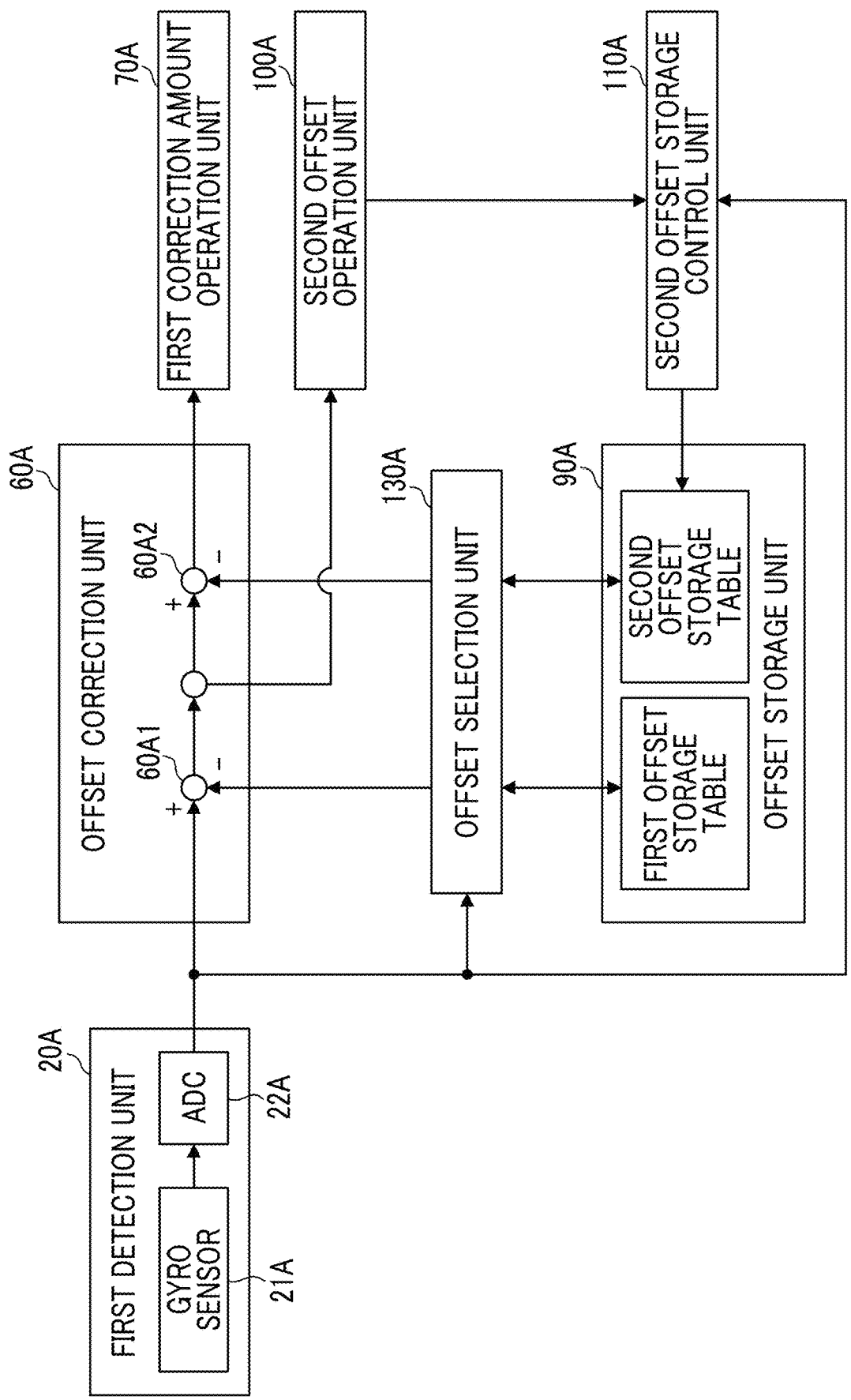
FIG. 37 is a block diagram of functions relating to offset correction in a case where offset correction is performed in accordance with a temperature.

FIG. 37 is a block diagram of functions relating to the offset correction in a case where the offset correction is performed in accordance with the temperature.

The case of offset-correcting the output signal of the first detection unit 20A is the same as the case of offsetting the output signal of the second detection unit 20B. Consequently, only a case where the output signal of the first detection unit 20A is offset-corrected will be described here, and a case where the output signal of the second detection unit 20B is offset-corrected will be omitted.

As shown in FIG. 37, the digital camera of the present embodiment is further provided with a function of the offset selection unit 130A with respect to the offset correction. The function of the offset selection unit 130A is implemented by the system control unit 50.

The offset selection unit 130A reads out the information about the first offset and the second offset according to the temperature from the offset storage unit 90A and applies the information thereof to the first subtraction unit 60A1 and the second subtraction unit 60A2.

Here, the temperature information is acquired from the first detection unit 20A. More specifically, the acquisition is performed from a gyro sensor 21A which is provided in the first detection unit 20A. The gyro sensor 21A outputs the temperature information together with the angular velocity. Since this type of gyro sensor (the gyro sensor having the temperature detection function) is well known, details of the description thereof will be omitted. The offset selection unit 130A acquires the temperature information from the first detection unit 20A and reads out the information about the first offset and the second offset corresponding to the acquired temperature from the offset storage unit 90A.

The offset storage unit 90A stores the information about the first offset and the second offset in a table format. The table that stores the information about the first offset is designated as a first offset storage table, and a table that stores the information about the second offset is designated as a second offset storage table. The first offset storage table stores the information about the first offset for each temperature. The second offset storage table stores the information about the second offset for each temperature. In addition, the term "for each temperature" described herein means "for each a certain temperature range". For example, in a case of storing in units of 1° C., the temperature equal to or less than the decimal point is truncated and stored.

The first offset storage table is a fixed table. On the other hand, the second offset storage table is a table that is updated at any time. The second offset storage control unit 110A acquires temperature information from the first detection unit 20A in storing the second offset calculated by the second offset operation unit 100A in the offset storage unit 90A, and updates the information about the second offset storage table. That is, the information about the second offset which is stored in the acquired temperature position is rewritten with the calculated second offset value. Thereby, a value of the second offset is updated for each temperature.

Figure 38:
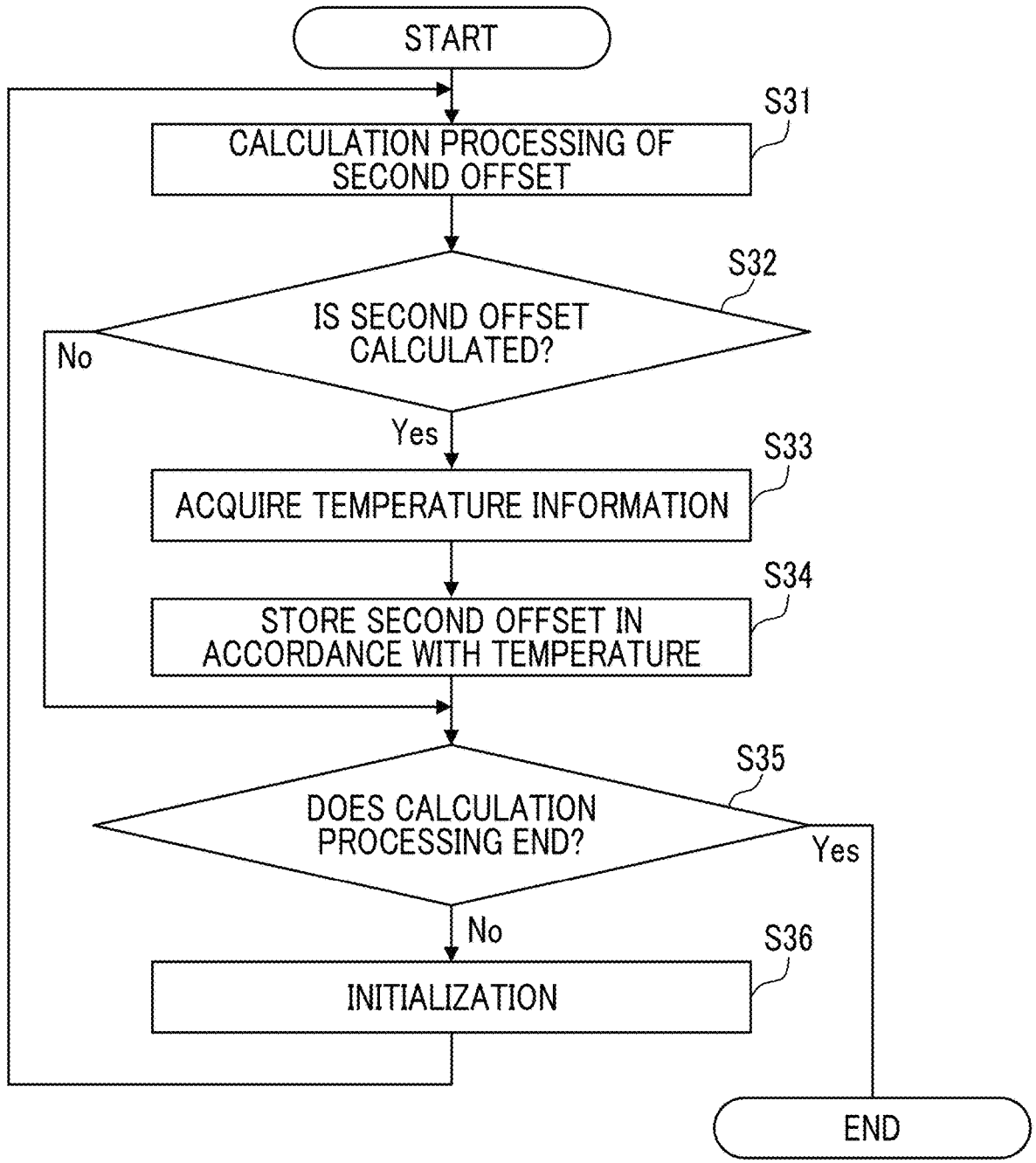
FIG. 38 is a flowchart showing a procedure of update processing of the second offset according to the temperature.

FIG. 38 is a flowchart showing a procedure of update processing of the second offset according to the temperature.

First, the calculation processing of the second offset is performed (step S31). Then, it is determined whether or not the second offset is calculated (step S32). In a case where the second offset is calculated, the temperature information is acquired (step S33). The second offset is stored in the offset storage unit in accordance with the acquired temperature (step S34). That is, the information in the second offset storage table which is stored in the offset storage unit is updated. In such a case, the information about the second offset which is stored in the acquired temperature position is rewritten.

Thereafter, it is determined whether or not the calculation processing of the second offset ends (step S35). The calculation processing of the second offset ends, for example, in a case where the power source of the digital camera is turned off. In a case where the calculation processing of the second offset ends, the update processing is also finished.

On the other hand, in a case where the calculation processing of the second offset is continued, the processing relating to the calculation is initialized (step S36), and the calculation processing is performed in the next calculation cycle.

Figure 39:
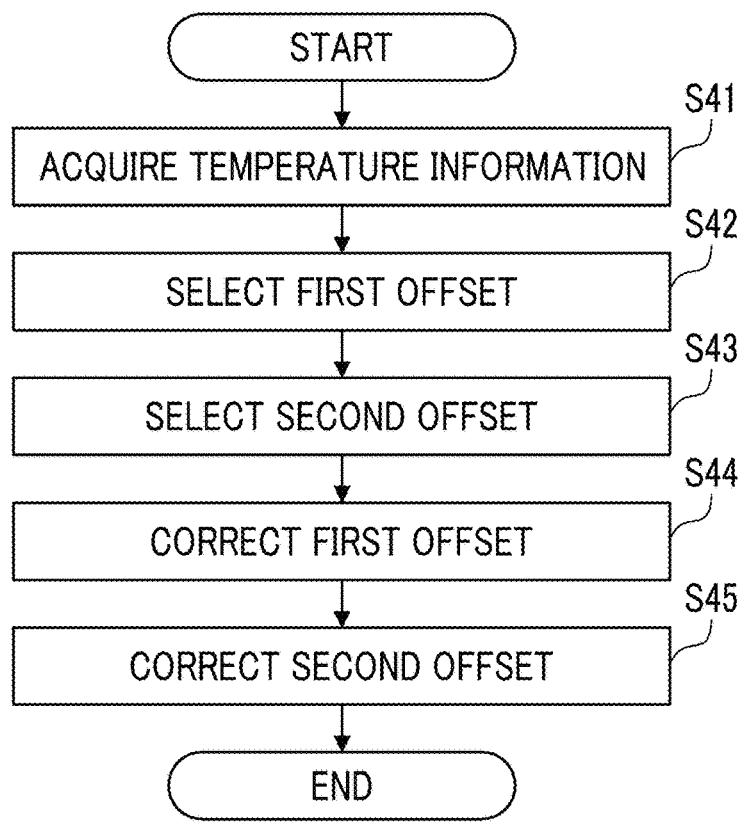
FIG. 39 is a flowchart showing a procedure of processing of offset correction according to the temperature.

FIG. 39 is a flowchart showing a procedure of the processing of offset correction according to the temperature.

First, the temperature information is acquired (step S41). Next, the first offset is selected on the basis of the acquired temperature (step S42). Thereby, the first offset according to the temperature is set. In a similar manner, a second offset is selected on the basis of the acquired temperature (step S43). Thereby, the second offset according to the temperature is set. Thereafter, the output signals of the first detection unit 20A and the second detection unit 20B are offset-corrected by the set first offset and second offset. That is, first, the first offset is subtracted from the output signal, and the first offset correction is performed (step S44). Then, the second offset is subtracted from the output signal after the first offset is subtracted, and the second offset correction is performed (step S45). Thereby, the offset is removed from the output signals of the first detection unit 20A and the second detection unit 20B.

As described above, according to the digital camera of the present embodiment, the offset correction is performed in accordance with the temperature. Further, the second offset is updated in accordance with the temperature. Thereby, the offset can be more accurately corrected.

In the present embodiment, the gyro sensor provided with a temperature detection function is used to acquire temperature information from the gyro sensor, but the means for acquiring the temperature information is not limited to this. For example, the temperature may be detected by a temperature sensor which is separately provided in the digital camera body.

Sixth Embodiment

Regarding the calculation processing of the second offset, in the above-mentioned embodiment, the configuration is such that the calculation is constantly performed while the digital camera is in operation (during the power source is turned on), or is calculated in a case where it is determined that the camera body is in the stationary state.

In the present embodiment, the calculation processing of the second offset is executed at a predetermined timing. For example, the execution is performed at timing at which the power source of the digital camera is turned off.

Figure 40:
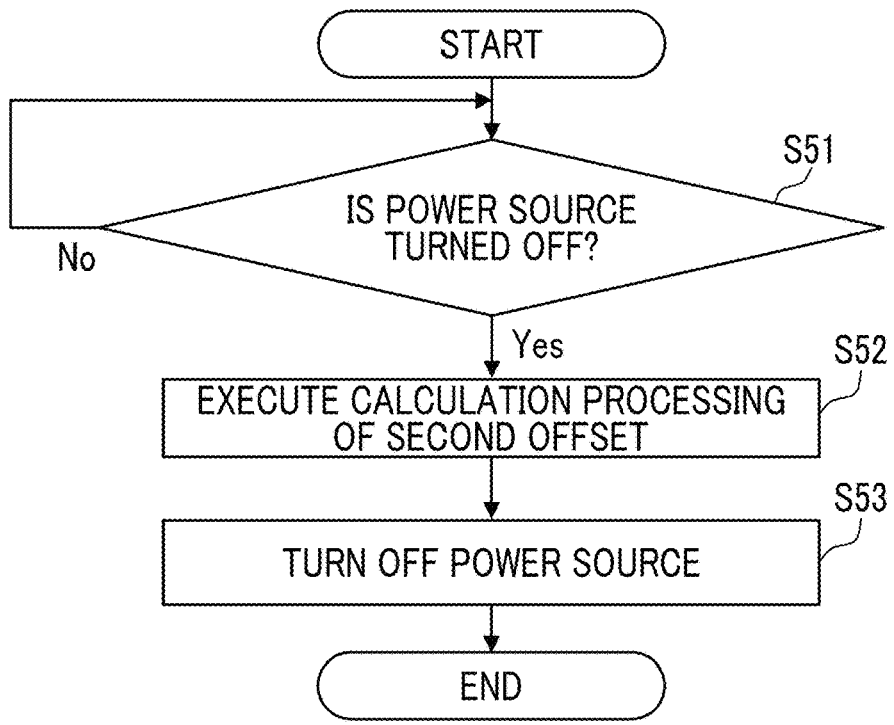
FIG. 40 is a flowchart showing a procedure of processing in a case where the calculation processing of the second offset is executed at timing at which a power source is turned off.

FIG. 40 is a flowchart showing a procedure of processing in a case where the calculation processing of the second offset is executed at the timing at which the power source is turned off.

First, it is determined whether or not the power source of the digital camera is turned off (step S51). More specifically, it is determined whether or not an operation of turning off the power source is performed.

In a case where the power source of the digital camera is turned off, the calculation processing of the second offset is performed (step S52). The processing described herein also includes processing of storing the calculated second offset in the offset storage unit.

In a case where the calculation processing of the second offset ends, the power source (so-called main power source) of the digital camera is turned off (step S53).

In such a manner, load of system control can be reduced by the configuration in which the calculation processing of the second offset is executed in a case where the power source is turned off.

In addition, the timing of executing the calculation processing of the second offset may be configured to be executed, for example, in a case where a state of no operation continues for a period which is determined in advance.

Further, the configuration may be configured such that the digital camera is executed while the power source of the digital camera is turned off. In such a case, for example, the configuration may be such that the execution is periodically performed at a time which is determined in advance.

In addition, in a case of executing the calculation processing of the second offset, it is preferable that the processing of determination of the stationary state is combined and executed in a case where the processing of determining that the camera body is in the stationary state. Thereby, the second offset can be more accurately calculated.

OTHER EMBODIMENTS (1) Another Embodiment of Calculation of Second Feature Amount Since the second feature amount, which is the gradient of the accumulated integral value of the output signal of the gyro sensor, is integrated for a long time, a bit shift may be used to widen the dynamic range. In such a case, it is preferable to determine the range of the dynamic range such that the calculation for which the gradient can be obtained can be performed with a resolution equivalent to that of the gyro sensor itself. More preferably, a range capable of measuring a shift of at least 1 [mdps] is used.

For example, it is assumed that the output from the gyro sensor is constantly 1LSB (n [mdps]) and the control cycle is N [Hz].

The integration of the output of the gyro sensor is calculated by the following expression.

$$INTEG[k]=(INTEG[k-1]+GYRO[k]*(1/n))*(1/nn)$$

GYRO: output of gyro sensor
INTEG: output of integration

The gradient of the accumulated integral value is calculated by the following expression.

$$OUT[k]=(INTEG[k]-OUT\_INIT)*(1/(COUNT*(1/N)))$$

OUT: gradient (second feature amount)
OUT_INIT: initial value of integration at start of calculation
COUNT: value obtained by adding 1 for each control cycle from start of calculation (initial value is 0).
GYRO[k]*(1/N) and *(1/(COUNT*(1/N))) and *(1/NN) are calculated in accordance with the values of n and N, and is represented by n [mdps] such that the gradient can be extracted through bit shifting.

(2) Apparatus to which Present Invention is Applied

In the above-mentioned embodiment, a case where the present invention is applied to a digital camera provided with a camera shake correction function is described as an example, but application of the present invention is not limited thereto. In addition, the present invention can be applied to various imaging apparatuses such as a video camera, a television camera, and a cine camera provided with the camera shake correction function.

Further, the imaging apparatus according to the present invention includes an imaging apparatus that is integrally incorporated into an imaging apparatus having a function other than imaging, as well as an imaging apparatus that is configured as a single unit. For example, an imaging apparatus, which is incorporated in a smartphone, a personal computer, or the like, is also included.

Further, for example, in a case where the interchangeable lens is provided with a camera shake correction function in an lens-interchangeable digital camera or the like, the present invention can be applied to the interchangeable lens. In such a case, for example, a system control unit provided in the interchangeable lens implements a function of the signal processing device. The interchangeable lens in such a case is an example of a lens apparatus.

Further, the present invention can be broadly applied to an apparatus provided with the camera shake correction function in addition to the imaging apparatus. For example, the present invention can be applied to an optical device such as binoculars having the camera shake correction function.

Further, the camera shake correction is not limited to the so-called lens shift method, and the present invention can be applied to a case where an image sensor shift method is adopted. The image sensor shift method is the camera shake correction function of the method of correcting camera shake by moving the image sensor (imaging element) in accordance with camera shake. Furthermore, the present invention can also be applied to a case where so-called electronic camera shake correction is adopted.

Further, the present invention can also be applied to applications other than camera shake correction. However, the camera shake correction of the imaging apparatus or the like has high required blurring detection accuracy. Therefore, the camera shake correction is particularly effective in a case where the camera shake correction is applied to blurring detection of the camera shake correction.

(3) Blurring Detection Sensor

In the above-mentioned embodiment, the case of processing the output signal of the gyro sensor is described as an example. However, the application of the present invention is not limited thereto. The present invention can be applied to a case of processing an output signal of a sensor in which the output signal includes an offset, particularly, an output signal of a sensor from which it is difficult to remove the offset with the fixed value.

(4) Offset Correction

In the above-mentioned embodiment, the offset is removed in two steps, but it is also possible to remove only the second offset. That is, the step of removing the first offset can be omitted.

(5) System Configuration

A processor, which implements each function of the signal processing device, a central processing unit (CPU) as a general-purpose processor, a programmable logic device (PLD) that is a processor capable of changing a circuit configuration after manufacturing such as a field programmable gate array (FPGA), a dedicated electric circuit that is a processor having a circuit configuration designed exclusively for executing specific processing of an application specific integrated circuit (ASIC), or the like.

Each function of the signal processing device may be implemented by one of these various types of processors, or may be implemented by two or more processors of the same type or different types (for example, a plurality of FPGAs or a combination of a CPU and an FPGA).

Further, each function of the signal processing device may be implemented by one processor. As an example of implementing each function of the signal processing device with one processor, first, there is a form in which one processor is configured by a combination of one or more CPUs and software and this processor implements each function of the signal processing device. Secondly, there is a form in which a processor that implements the function of the entire signal processing device with one integrated circuit (IC) chip, as represented by a system on chip (SoC) or the like, is used.

As described above, each function of the signal processing device is implemented by using one or more of the above-mentioned various processors as a hardware structure.

Furthermore, the hardware structure of these various processors is more specifically an electric circuit in which circuit elements such as semiconductor elements are combined.

EXPLANATION OF REFERENCES

1: digital camera
10: imaging optical system
11: zoom lens
12: focus lens
13: correction lens
14: stop
15: zoom lens driving unit
16: focus lens driving unit
17: correction lens driving unit
17x: first driving unit
17y: second driving unit
18: stop driving unit
20: angular velocity detection unit
20A: first detection unit
20B: second detection unit
21A: gyro sensor
21B: gyro sensor
22A, 22B: ADC
30: imaging element
40: main storage unit
41: digital signal processing unit
42: auxiliary storage unit
43: display unit
44: operating part
50: system control unit
60A: offset correction unit
60A1: first subtraction unit
60A2: second subtraction unit
60B: offset correction unit
70A: first correction amount operation unit
70B: second correction amount operation unit
71A: high-pass filter
72A: sensitivity correction unit
73A: integration unit
74A: correction amount calculation unit
80A: first driving control unit
80B: second driving control unit
90A: offset storage unit
90B: offset storage unit
100A: second offset operation unit
100B: second offset operation unit
101A: first feature amount extraction unit
102A: integration unit
103A: second feature amount extraction unit
104A: second offset calculation unit
104A1: difference calculation unit
104A2: determination unit
104A3: calculation unit
105A: initialization determination unit
106A: LPF switching unit
110A: second offset storage control unit
110B: second offset storage control unit
120A: stationary determination unit
120B: stationary determination unit
130A: offset selection unit
O: offset
O1: first feature amount
O2: second feature amount
Pit: pitch direction
Yaw: Yaw direction
S1 to S8: processing procedure for camera shake correction control
S11 to S18: processing procedure for calculation of second offset
S21 to S26: procedure of processing of determination performed by initialization determination unit
S31 to S36: procedure of processing of updating second offset according to temperature S41 to SS45: procedure of processing of offset correction according to temperature S51 to S53: procedure of processing in case where calculation processing of second offset is executed at timing at which power source is turned off

What is claimed is:

1. A signal processing device comprising:
a blurring detection sensor;
a memory; and
a processor configured to execute:
processing of calculating an amount of direct current component from an output signal of the blurring detection sensor and extracting the amount of direct current component, as a first feature amount relating to an offset;
processing of integrating the output signal;
processing of calculating a gradient of an accumulated integral value of the output signal from a value obtained by integrating the output signal and extracting the gradient of the accumulated integral value, as a second feature amount relating to the offset;
processing of calculating the offset on the basis of the first feature amount and the second feature amount;
processing of calculating an absolute value of a difference between the first feature amount and the second feature amount;
processing of measuring a time, during which the absolute value of the difference between the first feature amount and the second feature amount is kept equal to or less than a first threshold value, in a case where the absolute value is equal to or less than the first threshold value;
processing of storing the offset in the memory in a case where the time during which the absolute value is kept equal to or less than the first threshold value is equal to or greater than a second threshold value; and
processing of subtracting the offset stored in the memory from the output signal.

2. The signal processing device according to claim 1, wherein the processor is configured to
further execute processing of calculating an amount of change of the second feature amount, and
initialize processing relating to calculation of the offset in a case where the calculated amount of change of the second feature amount is greater than a third threshold value.

3. The signal processing device according to claim 1, wherein the processor is configured to further execute
processing of determining a stationary state on the basis of the output signal, and
processing relating to calculation of the offset in a case where the stationary state is determined.

4. The signal processing device according to claim 1, wherein the processor is configured to
further execute processing of acquiring temperature information in a case where the offset is calculated, and
store the calculated offset for each temperature.

5. An imaging apparatus comprising:
a blurring detection sensor that is provided in an apparatus body; and
the signal processing device according to claim 1 that processes an output signal of the blurring detection sensor.

6. A lens apparatus comprising:
a blurring detection sensor that is provided in an apparatus body; and
the signal processing device according to claim 1 that processes an output signal of the blurring detection sensor.

7. A signal processing method of processing an output signal of a blurring detection sensor, the signal processing method comprising:
calculating an amount of direct current component from an output signal of the blurring detection sensor and extracting the amount of direct current component, as a first feature amount relating to an offset;
integrating the output signal;
calculating a gradient of an accumulated integral value of the output signal from a value obtained by integrating the output signal and extracting the gradient of the accumulated integral value, as a second feature amount relating to the offset;
calculating the offset on the basis of the first feature amount and the second feature amount;
calculating an absolute value of a difference between the first feature amount and the second feature amount;
measuring a time, during which the absolute value of the difference between the first feature amount and the second feature amount is kept equal to or less than a first threshold value, in a case where the absolute value is equal to or less than the first threshold value;
storing the offset in a memory in a case where the time during which the absolute value is kept equal to or less than the first threshold value is equal to or greater than a second threshold value; and
subtracting the offset stored in the memory from the output signal.

8. A non-transitory and computer-readable tangible storage medium which stores thereon a program for causing, when read by a computer, the computer to execute the signal processing method according to claim 7.

* * * * *